United States Patent [19]

Evans et al.

[11] 4,375,654

[45] Mar. 1, 1983

[54] FACSIMILE VECTOR DATA COMPRESSION

[75] Inventors: John M. Evans, Southampton; Ian D. Judd, Chandlers Ford; Richard H. Lovie, Porchester; John F. Minshull, Olivers Battery Winchester, all of England

[73] Assignee: International Business Machines Corporation, Armonk, N.Y.

[21] Appl. No.: 63,311

[22] Filed: Aug. 2, 1979

Related U.S. Application Data

[63] Continuation of Ser. No. 840,464, Oct. 7, 1977.

[30] Foreign Application Priority Data

Dec. 20, 1976 [GB] United Kingdom ............... 53036/76

[51] Int. Cl.³ .............................................. H04N 7/12
[52] U.S. Cl. ......................... 358/260; 340/146.3 MA
[58] Field of Search .............. 358/260; 340/146.3 AE, 340/146.3 MA

[56] References Cited

U.S. PATENT DOCUMENTS

| | | | |
|---|---|---|---|
| 3,142,818 | 7/1964 | Holt | 340/146.3 AE |
| 3,609,685 | 9/1971 | Deutsch | 340/146.3 AE |
| 3,987,412 | 10/1976 | Morrin | 340/146.3 AE |
| 4,020,463 | 4/1977 | Himmel | 340/146.3 AE |

Primary Examiner—Joseph A. Orsino, Jr.
Attorney, Agent, or Firm—R. Bruce Brodie

[57] ABSTRACT

Graphical data on a document is raster scanned and the resulting bit pattern is processed to provide a processed bit pattern which represents lines which each are a single pel in width and indicative of the shapes of objects scanned on the document. These single pel wide lines may represent the outlines of objects on the center lines. The processed bit pattern is then directed to a line follower in which bits representing contiguous pels are detected and tested for linearity. When contiguous pels fail the linearity test, a new vector is started and the vector being tracked is terminated. Hardware for performing these operations is described. The resulting vector list is stored until needed for display. Optionally a display station can be used to correct faulty vectors or to encode alphanumeric data in a more convenient format than vector coding.

1 Claim, 43 Drawing Figures

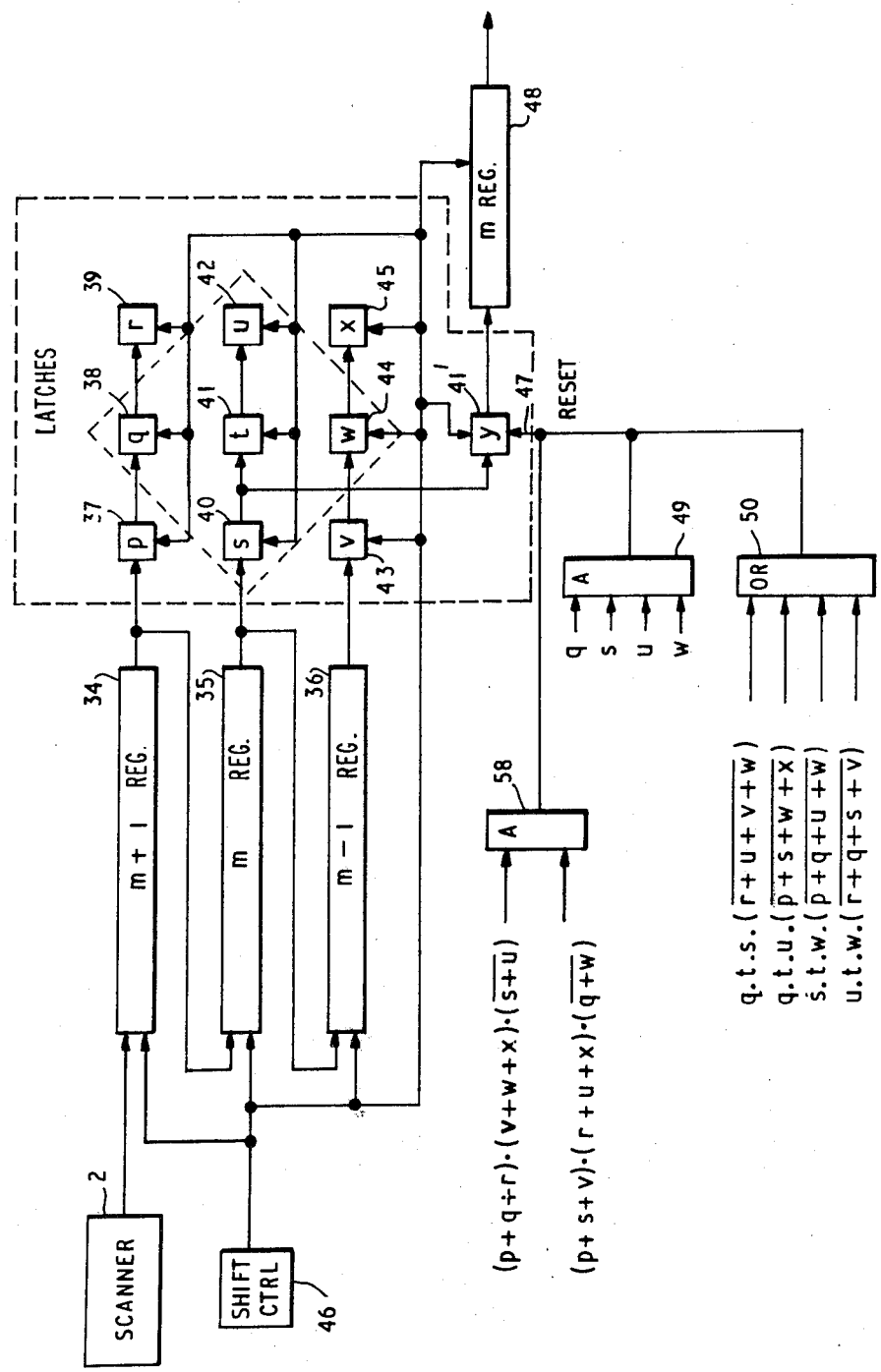

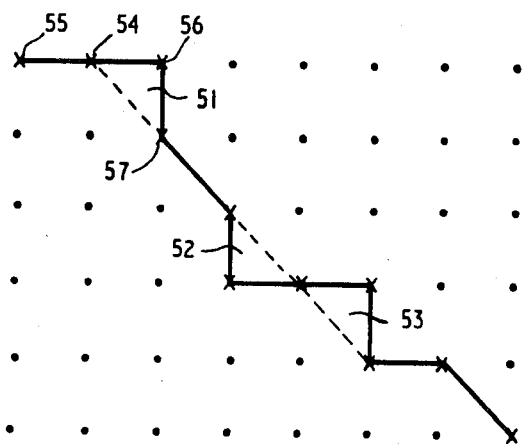
FIG. 10
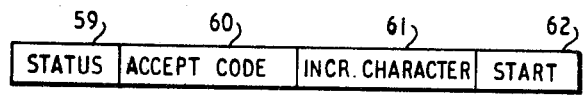
FIG. 11  VSW FORMAT
FIG. 12
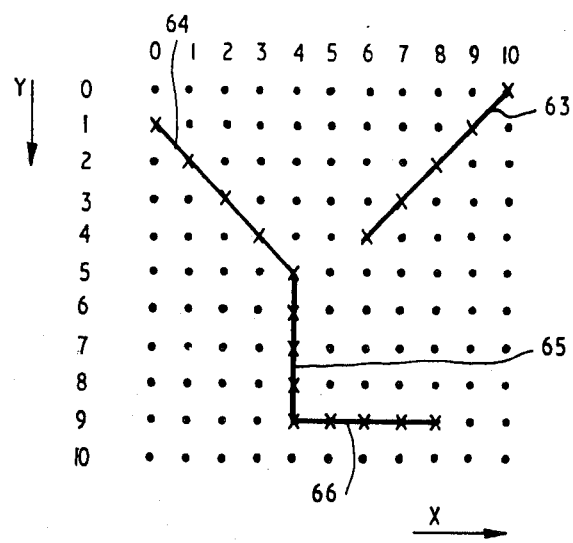
FIG. 13

| LINE No (Y ADDRESS) | SCAN POSN. (X ADDRESS) | VECTOR | CURRENT VSW ||||| UPDATED VSW ||||
|---|---|---|---|---|---|---|---|---|---|---|
| | | | ST. | AC. CODE | INC. CHAR. | S.A. | ST | AC.CODE | INC CHAR | S.A. |
| 0 | 10 | 63 BEGINS | 1 | (AB)CDE | 0 | 10,0 | 1 | (AB)CDE | 0 | 10,0 |
| 1 | 0 | 64 BEGINS | 1 | ABC(DE) | 0 | 0,1 | 1 | ABC(DE) | 0 | 0,1 |
| " | 9 | 63 CONTINUES | 1 | CDE | 4 | 10,0 | 1 | CDE | 4 | 10,0 |
| 2 | 1 | 64 " | 1 | ABC | 2 | 0,1 | 1 | ABC | 2 | 0,1 |
| " | 8 | 63 " | 1 | CDE | 44 | 10,0 | 1 | CDE | 44 | 10,0 |
| 3 | 2 | 64 " | 1 | ABC | 22 | 0,1 | 1 | ABC | 22 | 0,1 |
| " | 7 | 63 " | 1 | ABC | 444 | 10,0 | 1 | D | 444 | 10,0 |
| 4 | 3 | 64 " | 1 | D | 222 | 0,1 | 1 | B | 222 | 0,1 |
| " | 6 | 63 " | 1 | B | 4444 | 10,0 | 1 | D | 4444 | 10,0 |
| 5 | 4 | 64 CONTINUES | 1 | B | 2222 | 0,1 | 1 | B | 2222 | 0,1 |
| " | 5 | NO PEL | VECTOR 63 TERMINATED WITH START = 10,0 AND END = 6,4 ||||||||
| 6 | 4 | NOT VALID PEL FOR VECTOR 64 | VECTOR 64 TERMINATED WITH START = 0,1 AND END = 4,5 ||||||||
| " | " | NEW VECTOR 65 BEGUN ||||||||||
| " | 4 | 65 CONTINUES | 1 | (B)CD | 3 | 4,6 | 1 | (B)CD | 3 | 4,6 |
| 7 | 4 | 65 " | 1 | BCD | 33 | 4,6 | 1 | BCD | 33 | 4,6 |
| 8 | 4 | 65 " | 1 | C | 333 | 4,6 | 1 | C | 333 | 4,6 |
| 9 | 4 | 65 CONTINUES | 1 | C | 3333 | 4,6 | 1 | C | 3333 | 4,6 |
| " | 5 | NOT VALID PEL FOR VECTOR 65 | VECTOR 65 TERMINATED WITH START = 4,6 AND END = 4,9 ||||||||
| " | " | NEW VECTOR 66 BEGUN ||||||||||
| " | 5 | 66 CONTINUES | 1 | A(B)C | 1 | 5,9 | 1 | A(B)C | 1 | 5,9 |
| " | 6 | 66 " | 1 | AB | 11 | 5,9 | 1 | AB | 11 | 5,9 |
| " | 7 | 66 " | 1 | A | 111 | 5,9 | 1 | A | 111 | 5,9 |
| " | 8 | 66 CONTINUES | 1 | A | 1111 | 5,9 | 1 | A | 1111 | 5,9 |
| " | 9 | NO PEL | VECTOR 66 TERMINATED WITH START = 5,9 AND END = 8,9 ||||||||

FIG. 13A

| | RASTER LINE No | SCAN DIRECTION | ACCEPT CODE FROM VSW | MATCH ? |
|---|---|---|---|---|
| | n | → ← | C — | ✓ — |
| | n+1 | → ← | C — | X — |
| | n+2 | → ← | A B C D E | X ✓ |
| | n+2 | → ← | C D E | X ✓ |
| | n+3 | → ← | — D E | — ✓ |
| | n+3 | → ← | — E | — ✓ |
| | n+4 | → ← | — D | — ✓ |
| | n+5 | → ← | — E | — X |
| | n+5 | → ← | A B C D E | ✓ X |
| | n+5 | → ← | A B C D E | ✓ — |
| | n+6 | → ← | A B — | ✓ — |
| | n+6 | → ← | A B — | ✓ — |

FIG. 16

FACSIMILE VECTOR DATA COMPRESSION

This is a continuation of application Ser. No. 840,464 filed Oct. 7, 1977.

CROSS-REFERENCE TO RELATED APPLICATION

Cross reference is made to Minishul et al, U.S. Pat. No. 4,290,084, issued Sept. 15, 1981, and assigned to the International Business Machines Corporation, assignee of the present invention.

BACKGROUND OF THE INVENTION

This invention relates generally to facsimile pictorial communication systems and more specifically to data compression apparatus.

1. Field of the Invention

It has previously been proposed that documents, for example maps, could be digitized and the resulting data stored electronically in a computer. The stored data could then be recalled from storage, reconstituted and displayed on a display screen or printed on a printer/plotter. If a map, for example, needed correction or updating, the map could be displayed on a screen with which an operator can interact to make any necessary additions or corrections to the displayed map, using, for example a light pen, a keyboard or a tablet apparatus. The updated map can then be restored and/or printed.

An original document which is to be digitized can be scanned by a scanner whose output is a stream of bits which represent picture elements (pels) in successive lines of a raster scan. High resolution scanning requires a resolution of about 120 pels per inch (50 pels per cm) or more: In other words, each inch of a raster scan line on the document requires 120 pels or more for high resolution. Thus, a document which measures approximately 8×12 inches would require about 1.5 million pels to represent that document. It will be appreciated, therefore, that unless provision for compressing the rastered data is made, the requirements for electronic storage of documents could become prohibitive since each pel would require 1 bit of storage.

2. Description of the Prior Art

Various compression techniques have been proposed. For example, ARPS, U.S. Pat. No. 3,813,485, issued May 28, 1974, "System for Compression of Digital Data", describes the technique for thinning or whitening a black/white image array by way of predictive encoding. In this regard, the predictor estimates what the color value (black or white) should be based upon the color value of contiguous neighborhood pels. If the predicted and actual color values differ then an error value (black pel or '1') in a counterpart array position is registered. This array of error signals is substantially "whiter than" the original array. Error signals are then run length encoded. The effect of whitening is to reduce the coding to runs of white between errors rather than requiring the encoding of runs of length of both black and white.

T. Morrin, U.S. Pat. No. 3,987,412, issued Oct. 19, 1976, "Image Data Compression Utilizing Boundary Following of the Exterior and Interior Borders of Objects" describes an alternative technique in which a document is scanned in a raster fashion until an object (for example a character) is located. The scan then follows the contour of that object, recording each pel and removing pels from the boundary until the center of the object is reached. The raster scan is then resumed until the next object is encountered. This technique has the advantage that each item of compressed data relates to a single object and therefore each object can be electronically manipulated, for example rotated, while in compressed form.

The present invention is concerned with a different technique which is particularly useful for documents containing graphical information, for example maps.

SUMMARY OF THE INVENTION

According to the present invention, the compression of character data for graphic information of this invention first reduces the character to a line having a width of a single picture element. A line follower successively examines each picture element (pel) in the single-pel width line to form a vector from pels that follow a predetermined linearity from preceding pels. Separate vectors are initiated whenever contiguous pels do not fulfill the predetermined linearity condition.

Apparatus for vectorizing raster scanned data comprises means adapted to receive a raster bit pattern representative of a raster scanned document, means adapted to remove bits from the raster bit pattern to produce a processed raster bit pattern representing lines which each are a single pel in width, and line following means adapted to receive said processed raster bit patterns and produce therefrom a list of vectors representing said single pel wide lines, said line following means including means adapted to examine successively each bit position in the processed raster bit pattern to determine whether it represents a pel, means adapted to determine whether a detected pel is contiguous with a previously detected pel either on the same scan line or the preceding scan line, means adapted to determine whether contiguous pels fulfill a predetermined linearity condition, means adapted to record the status of vectors constituted by contiguous pels fulfilling said linearity condition, and means adapted to terminate one vector and initiate another vector whenever contiguous pels do not fulfill said linearity condition.

It is, therefore, an object of the present invention to provide an enhanced facsimile reproduction system.

Another object of this invention is to provide an improvement to apparatus for producing vectors.

Yet another object is to provide apparatus for vectorizing data for reproduction.

Still another object is to provide apparatus for vectorizing raster scanned data to produce vector lists representative of linear contiguous single pel wide lines.

These and other objects of the present invention will become apparent to those skilled in the art as the description proceeds.

BRIEF DESCRIPTION OF THE DRAWING

The various novel features of this invention, along with the foregoing and other objects, as well as the invention itself both as to its organization and method of operation, may be fully understood from the following description of illustrated embodiments when read in conjunction with the accompanying drawing, wherein:

FIG. 9 is a block diagram of apparatus for stripping pels from the raster scanned data, FIG. 10 illustrates how a vector can be produced with no right angle turns to give a smoothing effect, FIG. 11 illustrates the format of a vector status word, FIG. 12 illustrates how an accept code is derived, FIG. 13 shows four vectors and is used with FIG. 13A to show how each of the vectors is tracked in accordance with a first method of line following, FIG. 16 illustrates the tracking of the object shown in FIGS. 7A and 15A.

DESCRIPTION OF A PREFERRED EMBODIMENT

Figure 1:
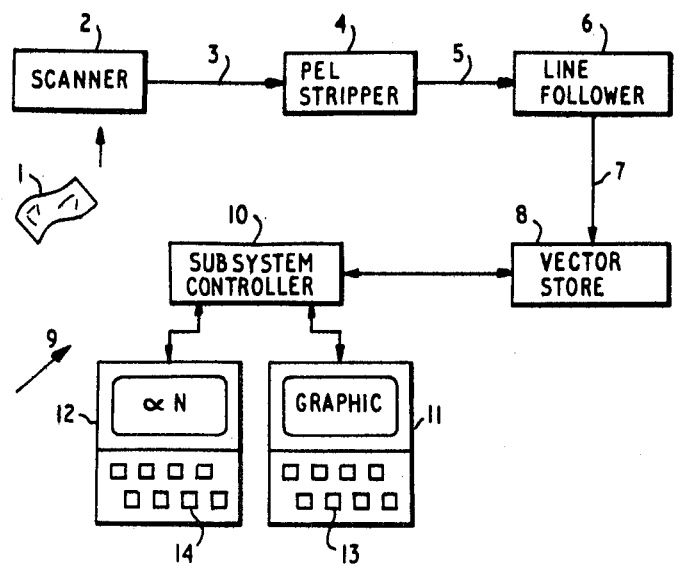
FIG. 1 is a block diagram showing the overall system configuration of apparatus for vectorizing data on a document.

Referring now to FIG. 1, apparatus for vectorizing data on a document 1 includes a scanner 2 for scanning the document 1 and providing an output signal on line 3 consisting of a bit pattern which represents the characters and lines on the document. The bit pattern passes through a pel stripper 4 whose purpose is to remove bits from the bit pattern to leave a processed bit pattern representing single pel wide lines. The single pel wide lines have the shapes of the lines and characters scanned and, as will be explained in more detail later, can represent the outlines or center lines of the scanned lines and characters.

The processed bit pattern from pel stripper 4 passes along line 5 to a line follower 6 whose purpose is to change the raster coded data into a coded representation in the form of vectors each having a start address and an end address. These vectors pass along line 7 to a vector store 8. The vector list in store 8 can be later displayed in any convenient manner. In one form of raster graphics display, vectors to be displayed are stored in vector form in a vector buffer, for example, see U.S. Pat. Nos. 3,996,585 and 3,906,480. The vector buffer is accessed by a raster vector generator which converts the vector information into raster form and loads it into a Cathode ray tube line buffer. The CRT line buffer is used to generate one line of the CRT display and is replenished with new line data during each line flyback period. An alternative technique, which can be employed to avoid the need for fast logic in the raster vector generator, uses a screen refresh buffer which consists of one bit for each pel to be displayed. A processor is used to load this refresh buffer with raster information derived from the vector list in the vector buffer. Directed beam displays can also be used.

No further details will be given as to how vector information can be converted into raster or other beam information for subsequent display since such does not form part of the present invention which is concerned with the production of vector information from scanned raster information.

Also shown in FIG. 1 is an optional feature of the present invention which allows interaction between the vectorized document and an operator. Details of this feature will be described later but briefly a work station 9 consists of a subsystem controller 10 which receives vectors from the vector store 8 and converts them into raster information for display. Vectors longer than a predetermined threshold are displayed on graphic display 11 and vectors shorter than this threshold are displayed on an alphanumeric display 12, the assumption being made that long vectors are probably graphical in nature while short vectors probably constitute alphanumeric characters. Operation of keyboards 13 and 14 allow displayed "documents" to be edited, corrected etc., allow the recording of characters, and allow attributes to be assigned to the component parts of the displayed "document".

The scanner 2 can be of any convenient form, for example, a scanning television camera or a solid scanner, which scans the input document in a raster fashion and produces a binary output whose level depends on the reflectivity of the area being scanned. This output may be chopped to produce a succession of bit pulses, each bit representing one pel (picture element). Thus, in FIG. 2, waveform A represents the digital output of a scanner. Bits 15 represent a scan across an object on the document which is four pels wide, bits 16 represent a scan across a three pel wide object, and bits 17 and 18 represent scans across one pel wide objects. Those skilled in the art will appreciate that the number of bits needed to represent a particular document will depend largely on the resolution of the scanner, that is, the number of pels per scan line and the number of scan lines used, and partly on the threshold of the scanner. In this latter connection, as a scanning spot traverses a light/dark boundary on the document, whether or not a light or dark pel is indicated will depend on the threshold of the scanner.

In accordance with the present invention, lines on the document are reduced to lines having a single pel width to allow line tracking without ambiguities. In accordance with the method to be described in detail within this specification, the single pel wide line can represent the boundaries of an object. Alternatively objects may be reduced in width until their center line is encountered. A variation of this technique which can be used where each object on the document has a substantially uniform thickness is to reduce the width until a single boundary remains. Clearly where objects have non-uniform widths, it is preferred to produce an outline.

Figure 2:
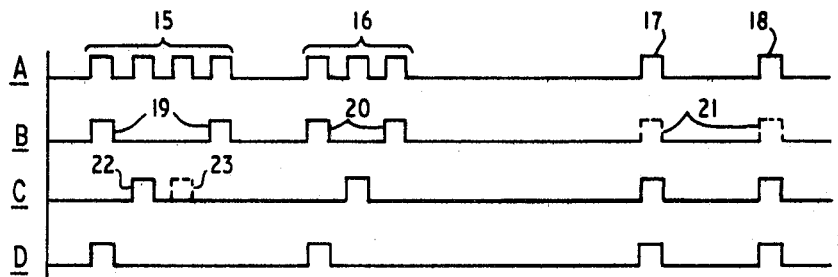
FIG. 2 illustrates how pels may be stripped from raster scan data.

Waveform B of FIG. 2 illustrates the effect of stripping pels from the raster information shown in waveform A. Thus, bits 19 represent the outline of the object represented by bits 15 and bits 20 represent the outline of the object represented by bits 16. In the embodiment to be described, objects which are less than three pels wide are removed on the assumption that they represent "noise" on the document. However, if the circumstances warrant, this assumption need not be made and the pel stripper can be arranged to retain bits representing one and two pel wide objects as indicated by broken line pulses 21.

Figure 3:
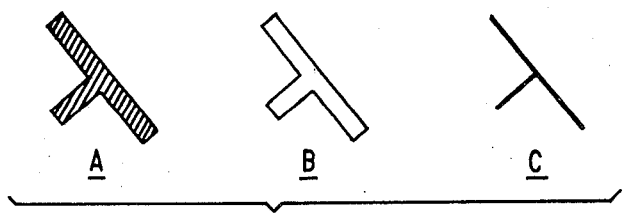
FIG. 3 shows the effect of stripping pels from a particular object.

Waveforms C and D of FIG. 2, respectively, show the effect of removing bits until either the center line or the left-hand edge of the objects remain. As is indicated in waveform C, where an object is an even number of pels wide, the center line cannot be in the exact center but can be assumed to be either just left of center as at 22 or just right of center as at 23. Object A of FIG. 3 shows an example of an object which is reduced either to an outline as shown in object B or to a center line as shown in object C.

Figure 5:
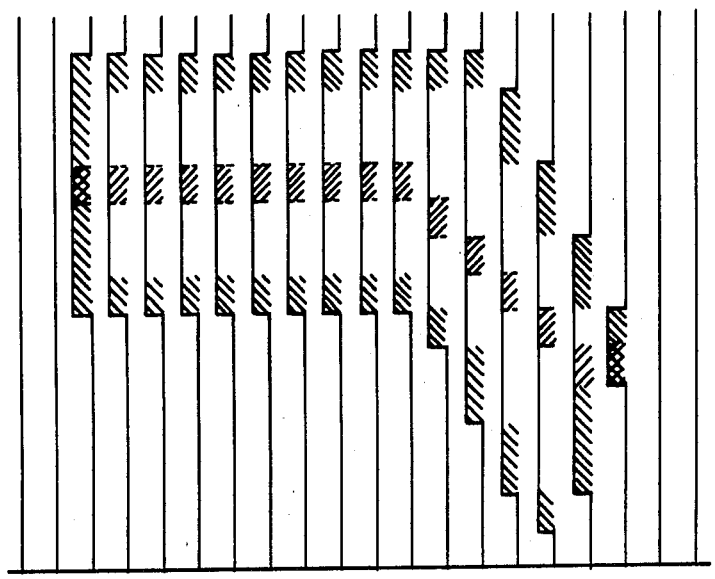
FIG. 5 illustrates in detail how pels may be stripped from the scanned object of FIG. 4, FIGS. 6A and 6B illustrate the raster scanned data when pels have been stripped in accordance with two different algorithms.
Figure 4:
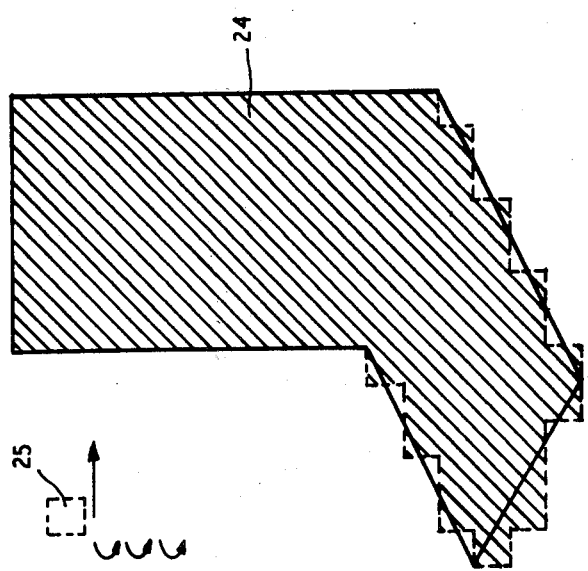
FIG. 4 illustrates in more detail how an object is scanned.

FIG. 4 illustrates a typical shape 24 which may be found on a document. The document is scanned in raster fashion, picture element by picture element, identified by a spot 25. Although coincidentally the horizontal and vertical edges of the shape 24 correspond to the edges of the scan lines and the scanning spot 25, the sloping edges do not match exactly. In the particular example shown, the scanner does not give an output whenever a boundary lies within the scanning spot, but only when a certain threshold is reached. Thus, the exact shape represented by the scanner output will be that shown shaded. FIG. 5 shows a series of waveforms representing the output of the scanner as the spot moves across the object 24. Not shown in FIG. 5 is the manner in which the output signal can be chopped to give a succession of bits. Shown in FIG. 5, however, are the signals which must be produced to represent either the outline or the center line of the shape 24. It will be seen in FIG. 5 that in the particular shape shown, the center line approach gives a slightly different shape to the object 24 although it will be appreciated that the scale of FIG. 5 does exaggerate the difference.

Figure 6A:
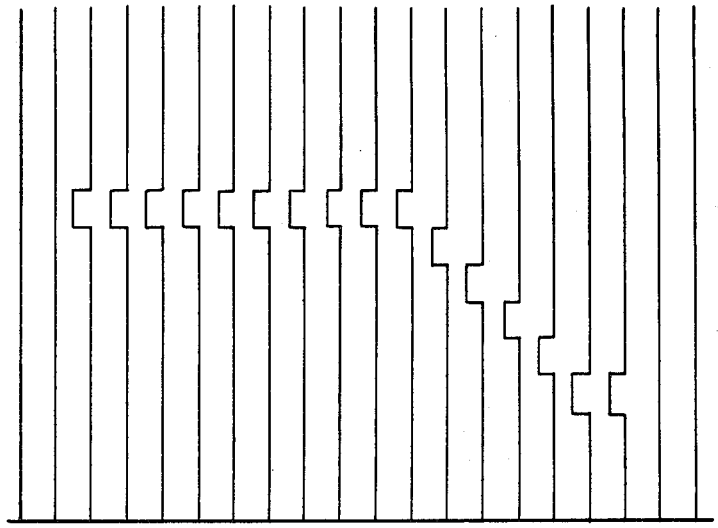
Figure 6B:
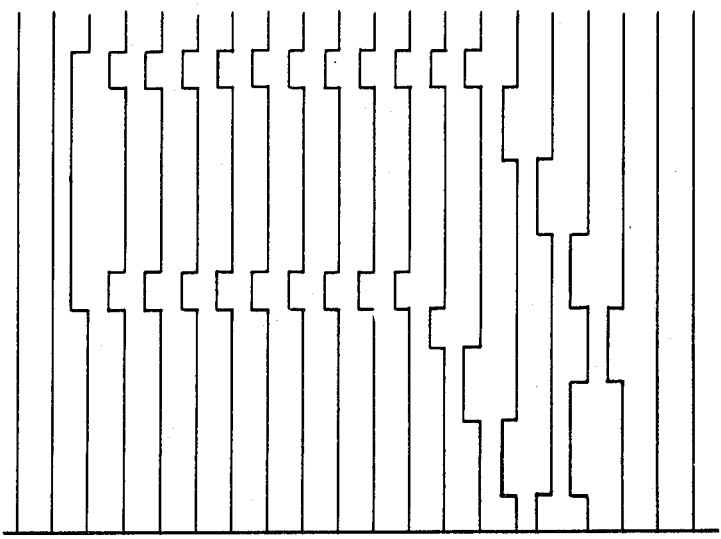
Figure 7B:
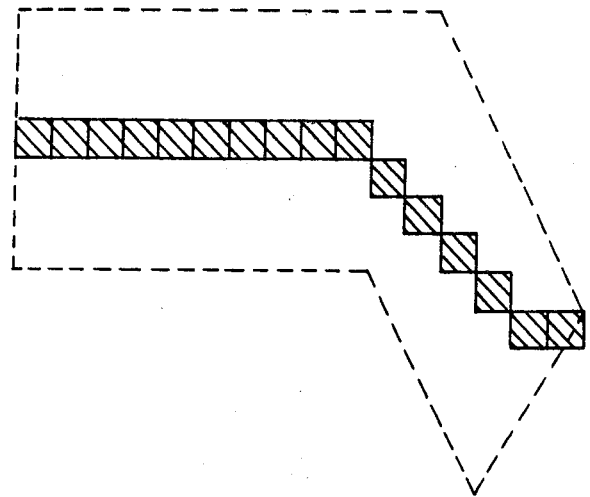
FIGS. 7A and 7B illustrate the appearance of objects after pels have been stripped from them.
Figure 7A:
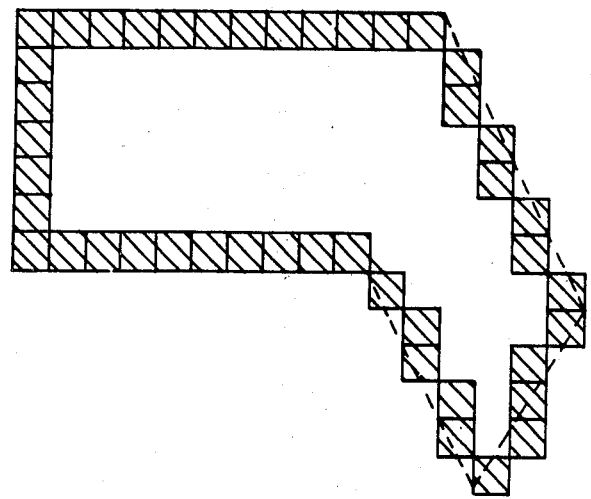

FIGS. 6A and 6B illustrate, respectively, the waveforms produced after picture element stripping in pel stripper 4, FIG. 1, to represent an outline or the center line. FIGS. 7A and 7B illustrate the actual pels represented by the bit patterns shown in FIGS. 6A and 6B respectively. Superimposed on FIGS. 7A and 7B in dotted line is the original shape 24.

Figure 8B:
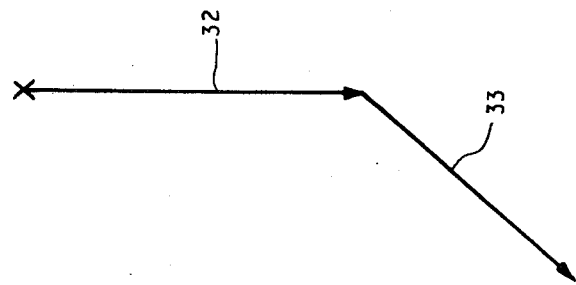
FIGS. 8A and 8B illustrate how the objects of FIGS. 7A and 7B respectively may be represented by vectors.
Figure 8A:
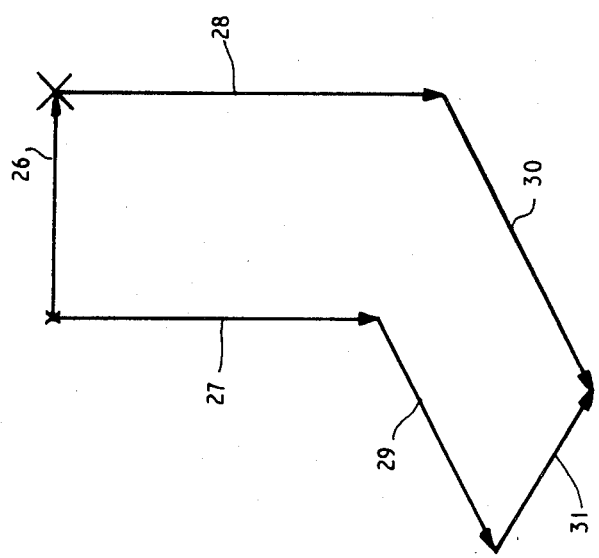

The purpose of the line follower 6 in FIG. 1 is to accept the bit pattern shown in FIGS. 6A or 6B, to follow the lines which that bit pattern represents, and to convert the bit pattern into a series of vectors. Thus, as shown in FIG. 8A, the outline of the shape 24 can be represented as a series of vectors 26 to 31: as shown in FIG. 8B, the center line can be represented by two vectors 32 and 33. Each vector needs four quantities to define it in cartesian coordinates. These can be $X_1 Y_1 X_2 Y_2$ where $X_1 Y_1$ is the start of the vector and $X_2 Y_2$ is the end, $X_1 Y_1 \Delta X \Delta Y$ where $X_1 Y_1$ is the start of the vector and $\Delta X$ and $\Delta Y$ are the changes in X and Y to the end of the vector, or $X_1 Y_1 S D$ where $X_1 Y_1$ is the start of the vector, S is its slope and D is its length (along the vector or along either coordinate). In the following description, a cartesian coordinate system will be used. It will be appreciated, however, that a polar coordinate system using the same principle could advantageously employ a circular or spiral raster scan rather than the rectangular raster scan.

FIG. 9 is a block diagram showing apparatus for removing bits from the bit pattern from the scanner 2. The serial bit stream from the scanner 2 is directed into a shift register 34 whose size is dependent upon the buffering requirements of the scanner 2. The output of the register 34 feeds a shift register 35 whose output in turn feeds a shift register 36. The shift registers 35 and 36 each have a size enabling it to contain one raster scan line of data plus two bits. The outputs of the register 34, 35 and 36 are directed, as shown, to latches 37 to 45. Such an arrangement enables the whole input document to be presented from the scanner 2 to the outline generator of FIG. 9 as successive three bit picture elements with one bit overlap above and below each picture element on the current raster scan line of interest.

To avoid unnecessary complications in the drawing, the data paths for handling picture start and end, and raster scan line start and end are not shown in FIG. 9. However, picture start conditions are handled by reproducing the last line in both of the registers 35 and 36 ("m" and "m−1" line registers). Line start and end conditions are handled by duplicating the first and last bits from each line. These duplicate bits are injected at the register 34 input by sensing control pulses from the scanner indicating raster scan line start and end points.

Operation of the shift registers 34 to 36 and the latches 37 to 45 is controlled by a shift control 46. A latch 41 is a duplicate of the latch 41 and contains the contents of the latch 41 except when it is reset by a pulse on an input line 47. As will be explained, the output of the outline generator comprising the apparatus of FIG. 9 is loaded into register 48, similar to shift registers 34 to 36, for subsequent processing.

The algorithm used by the outline generator relies on removing each bit that is totally enclosed by bits above, below, to the left of and to the right of it. Thus, for a bit in latch 41, it is necessary to consider the bits within the horizontally and vertically adjacent latches, that is latches 38, 40, 42 and 44. The contents of latches 38, 40, 42 and 44 are supplied therefore to an AND circuit 49 which will supply a pulse to line 47 to reset the latch 41' to "zero" whenever all of the latches 38, 40, 42 and 44 contain "ones". Thus, whenever latch 41 is reset, any bit within latch 41' is effectively removed from the bit pattern.

An OR circuit 50 is an optional feature which allows smoothing of the outline represented by the bit pattern from the outline generator. Referring momentarily to FIG. 10, a line is shown which contains three right-angle turns 51, 52 and 53. Examination of a point 54 shows that contiguity during later line following can be confused if there are 90° changes from horizontal or vertical because the point 54 has three immediate neighbors, that is, points 55, 56 and 57. The provision of the latches 37, 39, 43 and 45, FIG. 9, allows corner sensing by the OR circuit 50 ensuring that angular transitions occur in 45° steps. The dotted lines in FIG. 10 show the smoothed shape of the line after elimination of the right-angles, turns 51 to 53. Thus, not only does the OR circuit 50, FIG. 9 remove possible ambiguities but it also can give rise to a more pleasing effect to the final reproduction.

Returning once more to FIG. 9, it will be seen that the AND circuit 49 will provide a reset pulse to line 47 only when the latch 41 is surrounded vertically and horizontally by "one" bits in the neighboring latches. Thus, the outline generator described can be said to have a threshold value of three since outline generation can only occur when a picture feature can be digitized by three or more pels on both the x and y axes. Where noise, etc. generates a representation of less than the threshold, the AND circuit 49 will fail to reset the latch 41. The threshold value can be raised by including further inputs to the AND circuit 49. This would require the provision of extra latches and shift registers for lines "m−2" and "m−2" if the threshold value were to be raised to five.

Were single pel noise to be undetected, it would be sent into the register 48 as apparently processed data. The single pel noise is therefore preferably eliminated by detecting single pel features as a further reset to the latch 41'. To this end, an AND circuit 58 accepts the logically combined contents of the shift registers 37 to 40 and 42 to 45 as shown. The output signal of the AND circuit 58 is also supplied to the line 47 to reset the latch 41'.

To summarize the operation of the apparatus shown in FIG. 9, the raster scanned bit pattern received from scanner 2 is processed by the outline generator to discard single pel noise, to round off corners and to discard pels which are completely surrounded by other pels. The resultant bit pattern is still in a raster scan but all lines represented by this processed pattern are only one pel in width. This allows unambiguous tracking of the lines during subsequent line following operations. It will be appreciated that although an outline generator has been described, a center line generator could be used to produce a bit pattern containing signals representing single pel width lines. Alternatively, in certain cases, it may be possible to remove pels from the raster pattern until only one edge remains.

One advantage, however, of the outline approach is that no line can ever intersect another line. In center lining, where it is possible for lines to intersect so that one point can have two or more valid contiguous points, it can be arranged that this condition signifies the end of one vector and the beginning of two vectors or vice versa.

Two different methods and apparatus for tracking the outline will now be described. A first technique will be described with reference to FIGS. 11 to 17. As the processed raster data is received by the line following apparatus, it detects pels and determines whether a detected pel lies on an existing vector. If it does, a record of the existing record is updated: if it does not, a new vector record is created. Linearity of the vector or vectors being tracked is checked using a read only store. As will be seen, the vector length which can be tracked is determined by the size of this read only store.

FIG. 10 shows the format of a vector status word which is used to record the status of the vector. Each vector being tracked will have an assigned vector status word VSW. The VSW contains a status field 59, FIG. 11, whose purpose is to indicate whether the VSW relates to an active vector, that is, a vector currently being tracked, or an inactive vector. A field 60 contains an accept code whose purpose will be explained more fully later. Briefly, the accept code is an indication of where the next pel must be if it is to remain on the same vector. A field 61 contains the incremental characteristic of the vector. The incremental characteristic is a number which is unique to a particular vector and which, as will be seen later, is used to address a read only store with the result of a comparison during linearity testing to determine a new accept code. A field 62 contains the starting address of the vector to which the vector status word relates.

FIG. 12 shows how the accept code is derived. If pel 0 represents a pel on a raster scan line, then the adjacent pels are pels A and E on the same raster line and pels B, C and D on the next raster line. During linearity testing, the pel adjacent to pel 0, if there is one, is detected and its relative position, i.e. A, B, C, D or E determined. This is compared with the accept code in the vector status word for that particular vector and if there is correspondence, the new point can be regarded as falling on the same vector, and the vector status word can be updated. If there is no correspondence, the existing vector can be terminated at the previous point and the new point can be terminated at the previous point and the new point can be recorded as the starting point of a new vector.

As indicated above, where single-pel lines representing an outline are produced, no line can intersect another line. This simplifies the line following process since there can never be any ambiguity: any one pel can only have two pels adjacent it, one pel preceding it, and one pel succeeding it on the line being tracked. If, on the other hand, the pel stripping process has produced single pel wide lines representing the centers or one edge of scanned objects, these lines could intersect or branch. In such an event, to avoid unnecessary complications in determining which of two succeeding and adjacent pels lie on the vector being tracked, it is simpler to terminate a vector whenever two adjacent succeeding pels are detected, and to initiate two new vectors. This process will now be described in detail in the following description which is concerned with the tracking of nonintersecting lines representing the outlines of the scanned objects.

The line following process will be described with reference to FIG. 13 which shows four exemplary vectors and FIG. 13A which is a table showing how testing is accomplished and how vector status words are updated during the line following process. In FIG. 13, there is a matrix of 10×10 addressable points each of which can represent a picture element. For convenience, the top left-hand corner is taken as the origin of the X, Y cartesian coordinates. The line following apparatus receives a serial stream of 100 bits from the pel stripping apparatus: some of these bits are "zeros" and others are "ones" indicating that the corresponding pel is a point on one of the lines 63 to 66.

The line follower receives ten bits at a time representing one line of the raster scan, determines which positions contain a pel, if any, and either updates the vector status word or creates a new one. Thus, referring to FIGS. 13 and 13A, when the line with Y address equal to 0 is checked, a pel is found in X position 10. Since there are no existing vectors, the line follower creates a vector status word. Although in general a new vector can extend in any direction and can have an accept code equal to ABCDE, in the particular example shown, the codes A and B are not available. In line Y=1, the first pel encountered is that at X=0. A new vector status word is created since there is no existing vector in the corresponding position on the preceeding raster line. Also on line Y=1, a pel is found at X=9. This is at a direction D from the pel at X=10, Y=0: thus the new point fulfills the accept code condition and accordingly lies on vector 63. The VSW is updated by inserting a new incremental characteristic. This incremental characteristic is a number which is unique to the current status of a vector. Thus, in the example shown, a vector with an incremental characteristic of "4" is a two pel vector with a 45° slope as shown. As will be explained later, the incremental characteristic is used to address a read only store for an updated accept code.

In line Y=2, a pel is detected at X=1 at a direction B from the pel at Y=1, X=0 which corresponds to one of the accept codes associated with vector 64. The vector status word is updated with a new incremental characteristic ("2" representing a two pel vector with 135° slope). Also in line Y=2, a pel is detected at X=8 at a direction D from the pel at Y=1, X=9. Checking this direction with the accept code C D E from the vector status word indicates that the new pel is part of the vector 63 which is being tracked. A new incremental characteristic is inserted in the vector status word which is also updated with a new accept code derived from a read only store accessed with the incremental characteristic and comparison result. This process is continued for each raster line approximately updating the vector status word.

In line Y=5, pel is detected at X=4 and the vector status word of vector 64 is updated. However no pel is found at X=5 which represents the next position at which a pel could fulfill the linearity constraints for vector 63. Thus, vector 63 is terminated at the last pel position Y=4, X=6.

In raster line Y=6, a pel is detected at X=4. However, since this does not fulfill the accept code for vector 64, vector 64 is terminated at Y=5, X=4 and a new vector status word is created for vector 64. The vector tracking process continues for raster lines 7 and 8 until on line Y=9, X=5, a pel is detected which does not fulfil the linearity requirement for vector 65. Vector 65 is terminated and a new vector status word is derived for vector 66.

Figure 13B:
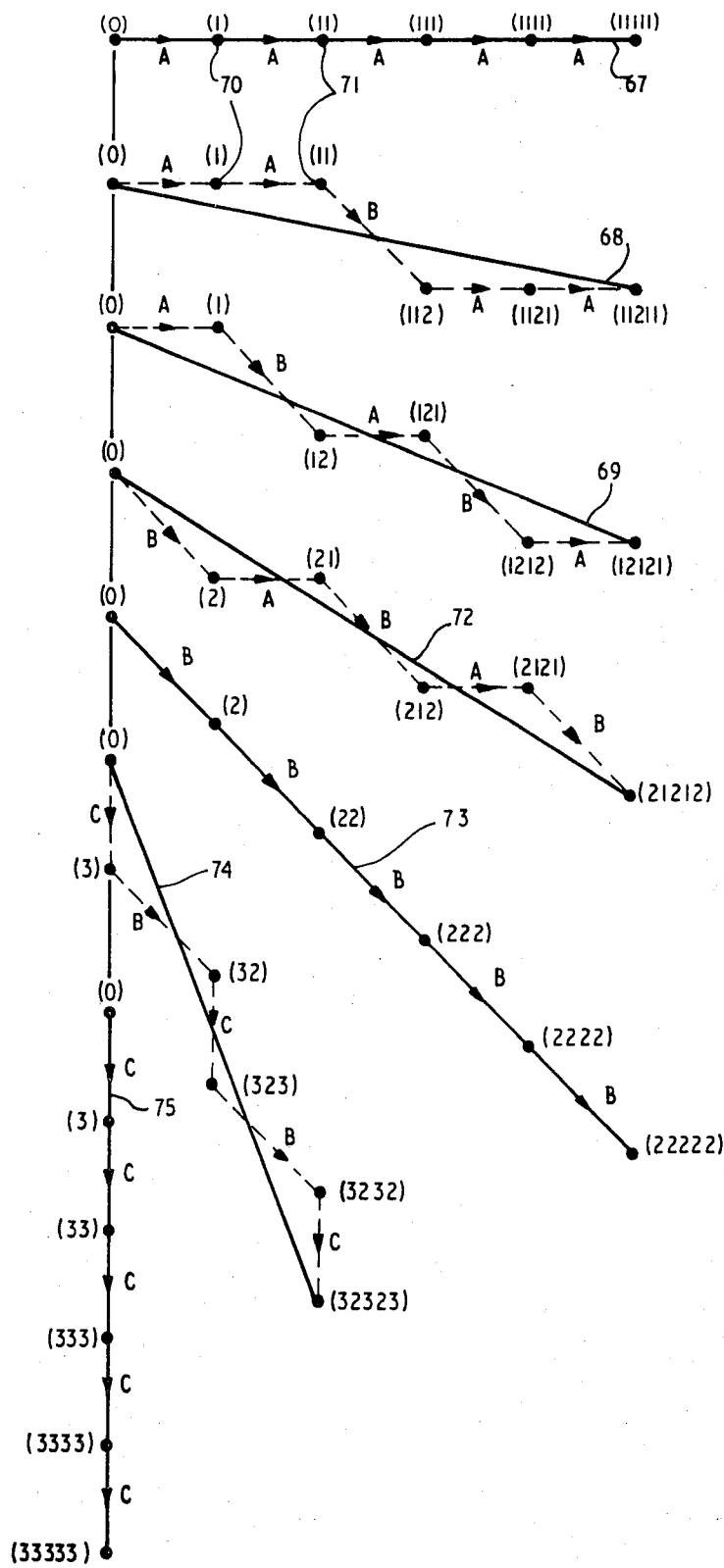
FIG. 13B illustrates the relationship between accept codes and incremented characteristics.

The relationship between incremental characteristics and accept codes can be seen with reference to FIG. 13B which shows seven different lines each represented by six pels. Shown in the figure are the various accept codes. The numbers shown in brackets beside each pel represent arbitrary numbers which constitute the incremental characteristic of the vector extending from the origin (O) to that point. Thus, lines 67, 68 and 69 all begin with the vector having an incremental characteristic equal to (1). Depending on whether a line having the slope of 67, 68 or 69 is being tracked, this vector will have an accept code of A (for lines 67 and 68) or B (for line 69). Similarly the vector having an incremental characteristic (11) has an accent code of A (for line 67) or B (for line 68). As the vector gets longer, the number of possible accept codes at any one point on the vector will reduce to one. Thus, at the origin (O), all five accept codes are valid, at points 70 and 71, two accept codes are valid but further from the origin only one accept code will be valid (for line 69 either A or B).

Similar considerations also apply for the lines 72, 73, 74 and 75. Thus, it will be seen that the incremental characteristic of a vector defines not only its direction but also its length.

Figure 14:
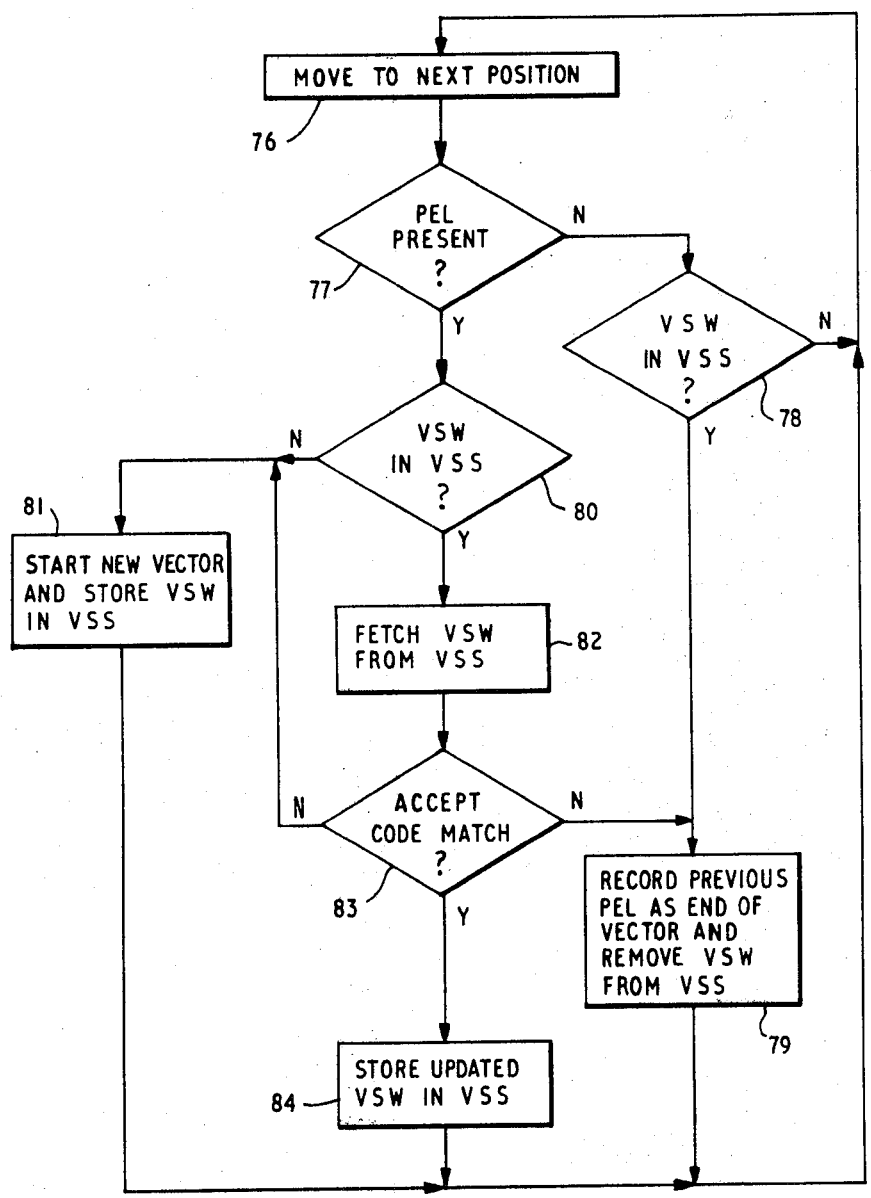
FIG. 14 is a simplified flow chart illustrating the first method of line following.

FIG. 14 is a flow chart illustrating the line tracking process. Assume that the line following apparatus has been set to the next position in the raster scan as in a block 76. First, a determination is made as at a decision block 77 whether a pel is present. If it is not, a check is made as at a decision block 78 as to whether there is a vector status word VSW in the vector status store VSS.

If there is not, then the next position in the raster scan is considered by returning to the block 76. If there is a vector status word in the vector status store in the decision block 78, then the previous pel on that vector is the end point. Thus, in a next step shown in a block 79, the vector is terminated and the vector status word is removed from the vector status store. The next position can then be considered by returning to the block 76.

If the determination at the step 77 is that a pel is present, a check is made at a decision block to determine whether a corresponding vector status word is contained in the vector status store. If there is no vector status word, the presence of a pel must indicate the start of a new vector. Thus, in the next step in block 81, a new vector status word is created and stored in the vector status store. The next position can then be considered in block 76.

If the determination at the decision block 80 is that a vector status word already exists, the vector status word is fetched from the vector status store as shown in a block 82 to allow a determination of whether the point currently being checked is a valid extension of the vector. This determination is made by determining whether there is an accept code match as shown in a decision block 83. If there is no match, the new point belongs to a new vector. Therefore, a new vector status word is created as shown in the block 81 and the previous vector is terminated as shown in the block 79. If, on the other hand, the determination in the decision block 83 is that there is an accept code match, the vector status word is updated and stored in the vector status store as shown in a block 84. The next position can then be considered by returning to the block 76.

It will be appreciated that as the line follower scans along a raster line, say from left to right, it may encounter a pel which does not match the accept code but which nevertheless belongs to the same vector. This will be seen in FIG. 15A which shows the accept codes of pels for an outline corresponding to that shown in FIG. 7A. On a left to right scan of line 85, pel 86 will be encountered before pel 87. However, pel 86 is not contiguous with pel 88 which is the current end of the vector being followed.

Figure 15B:
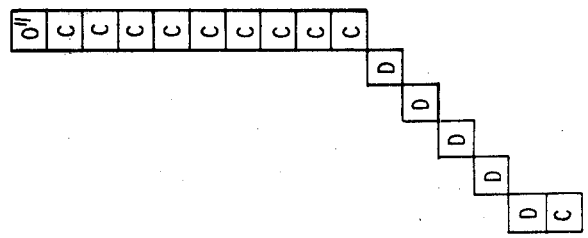
FIGS. 15A and 15B show the accept codes for the objects shown in FIGS. 7A and 7B respectively.

This problem is overcome by operating the line follower to scan along each raster line in both directions. Thus, each raster line is first scanned from left to right considering only vectors with accept codes ABC. A second scan from right to left considers vectors with accept codes D and E. This allows vector tracking to proceed for lines with positive and negative slopes without the need to retain intermediate X addresses. FIG. 15B shows the accept codes for the center line shown in FIG. 7B.

Figure 15A:
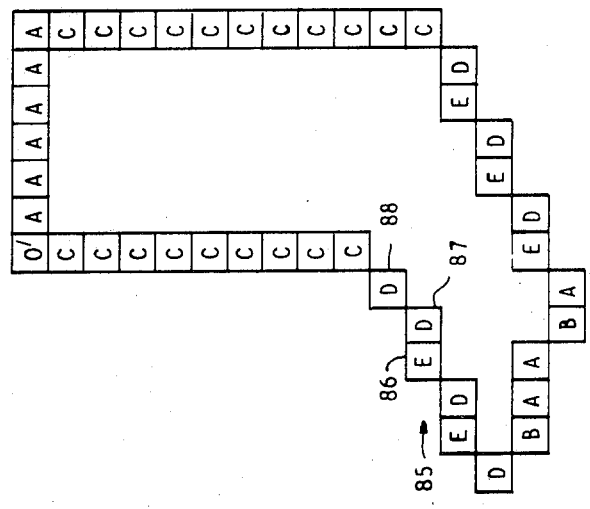

FIG. 16 illustrates part of the raster bit pattern of FIG. 15A and shows how the use of a left to right and a right to left scan of each raster line allows both the positive and negative slope lines to be tracked. Each time there is a match of the accept codes (represented by a check) the vector status word is updated. Each time there is a definite mismatch (represented by a cross) a new vector status word is created and the existing vector is terminated.

Figure 17:
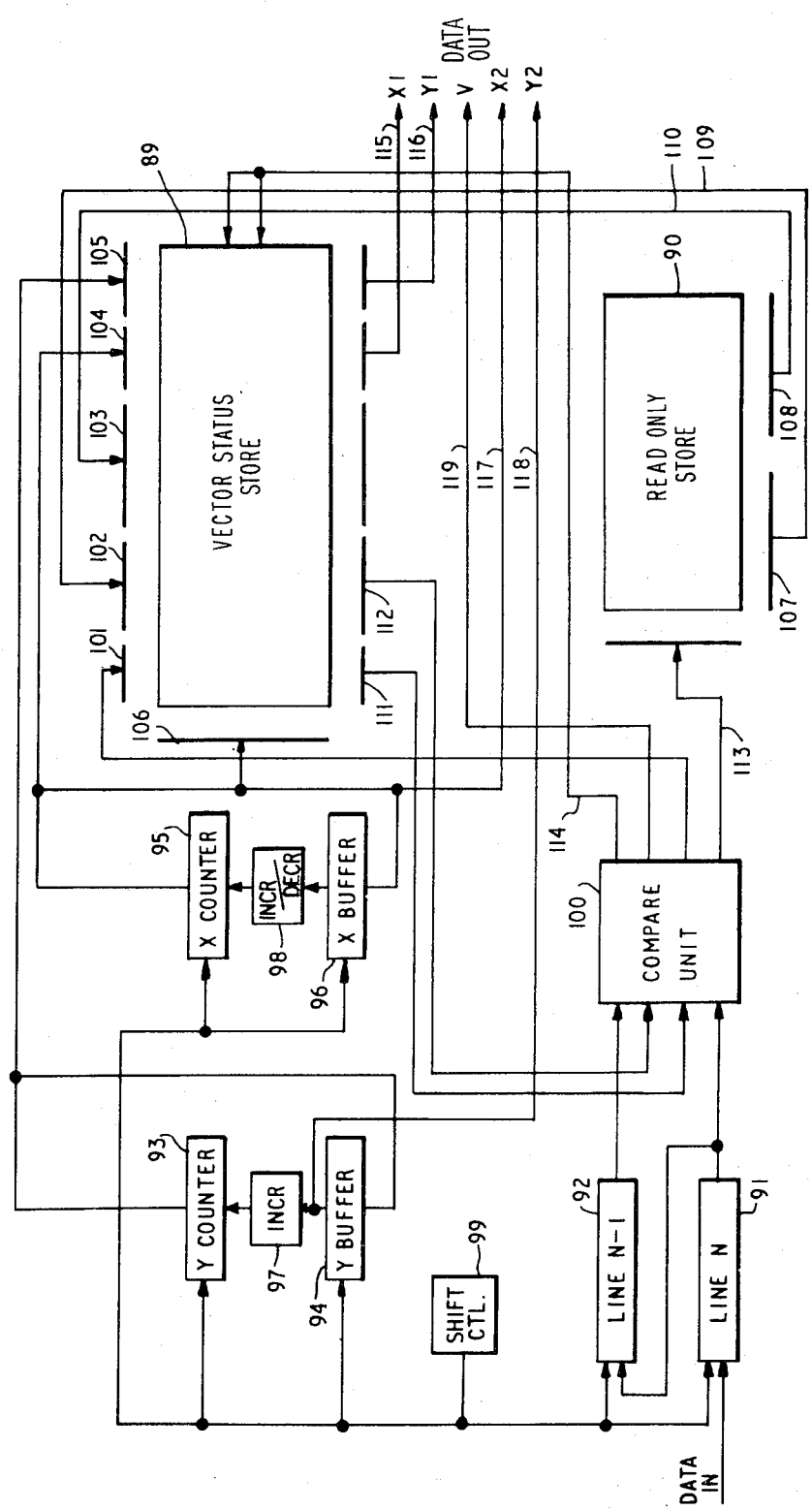
FIG. 17 is a block diagram of apparatus for performing the first method of tracking a line.

Apparatus for tracking an outline is shown in FIG. 17. Essentially the apparatus comprises a vector status store 89, a read only store 90, shift registers 91 and 92, a Y counter 93 and a Y buffer 94, an X counter 95 and an X buffer 96, an incrementer 97, an incrementer/decrementer 98, a shift control 99 and a compare unit 100.

The vector status store 89 contains the vector status words relating to vectors which are currently being tracked. As will be recalled with reference to FIG. 11, the vector status word contains a status field, an accept code field, an incremental characteristic field, and a start field. The vector status store is therefore provided with corresponding input registers, that is, a status input register 101, an accept code input register 102, an incremental characteristic input register 103, an X start input register 104, and a Y start input register 105. Vector status words are stored within the vector status store 89 in accordance with the position of the current end point. A register 106, therefore, controls the loading and unloading of vector status words in accordance with the current X-address.

Read only store 90 contains a list of incremental characteristics together with their associated accept codes. An accept code output register 107 and an incremental characteristic output register 108 allow updated data to be sent on lines 109 and 110 to the input registers 102 and 103, respectively. The shift register 91 is sufficiently large to accommodate one raster line of data. Its output is directed to the input to the similar shift register 92 as well as to the compare unit 100. Thus, the register 91 contains the current raster line, and the register 92 contains the immediately preceding raster line. The output of register 92 is also supplied to the compare unit 100. The other inputs to the compare unit 100 are the output of a status output register 111 and the output of an accept code output register 112.

The Y-buffer 94 contains the Y address of the raster line preceding the current raster line (i.e., n−1). The contents of the Y buffer 94 are loaded into the Y counter 93 after incrementing in the incrementer 97: thus, the counter 93 contains the Y address of the current raster line (i.e., n). The X-buffer 96 contains the X address of position immediately preceding in time the current point of interest: thus in a left to right scan, it will be to the left of the current point of interest while in a right to left scan, it will be to right of the current point of interest. The X-address of the current point of interest is stored in the X counter 95 by incrementing or decrementing the contents of the buffer 96 depending on the direction of scan.

The compare unit 100 receives inputs from the shift registers 91 and 92, accept codes (if any) from the vector status store 89 via the accept code output register 112, and the vector status bit from the vector status store 89 via the status output register 111. The vector status bit identifies a vector which requires tracking. Thus, during a left to right scan, only vector status words having accept codes ABC will be accepted in the compare unit 100. During the subsequent right to left scan, only vector status words having accept codes D E will be accepted for possible update.

The compare unit 100 operates in accordance with the flow chart of FIG. 14. Thus, each step in tracking causes a compare in the compare unit 100 of the accept code (from the vector status store) and the outline extension (from shift register 91). If a match occurs, output line 113 of the compare unit 100 is used as the address for obtaining a new incremental characteristic and accept code from the read only store 90. This characteristic and code are used to update the vector status word which will be loaded into the new position in the vector status store 89.

When no pel is detected which meets the accept code, the compare unit 100 causes termination of the vector being tracked. A signal on line 114 causes the XY address of the start of the vector ($X_1$ $X_1$) to be supplied to output lines 115 and 116 respectively. At the same time, the contents of the Y buffer 94 and the X counter 95 are supplied on lines 117 and 118, respectively, as the end address of the vector ($X_2$ $Y_2$). A signal V on line 119 from the compare unit 100 signifies to external logic that the signals on lines 115 to 118 represent a completed vector.

All vectors whose status is stored in the vector status store 89 prior to processing raster line n can be considered as being tracked to line (n−1). Thus, when a vector cannot be extended to line n, it is deleted from the vector status store. All vectors present in the vector status store 89, therefore, have a Y address of n after update. The X address of the current end point is retained by storing the incomplete vector at the vector status store address which represents the current vector end point.

The complete vectorization process so far described can be summarized as receiving a raster scan bit pattern which represents a scanned image, removing bits from the bit pattern to give a processed raster scan pattern which represents single pel wide lines, and then tracking these lines to convert them to a series of vectors, each vector being defined in terms of its start and finish. Described in some detail is bit stripping apparatus for producing an outline and also line tracking apparatus for converting the processed raster patterns into vector form. The resultant vectors can be stored in a vector list for subsequent display on a cathode ray tube. Such a display could be a directed beam tube or a raster scanned tube.

Using a read only store to derive accept codes during vector linearity testing has the drawback that the length of the vectors depends upon the size of the store. Thus, if tracking of very large vectors is required, the cost of the read only store may become unduly high.

Figure 18A:
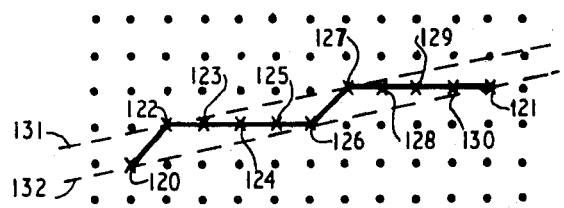
FIGS. 18A to 18C illustrate the basis of a second method of tracking a line and testing it for linearity.
Figure 18B:
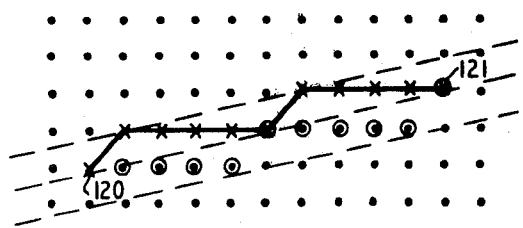

A preferred embodiment of a line tracker which does not suffer from this disadvantage will now be described with reference to FIGS. 18 to 26. Referring now to FIG. 18A, a line between points 120 and 121 can be represented by points 122 to 130. Dotted lines 131 and 132 represent a path one pel wide which can cover all the connected points 120 to 130. If however, only the end points of the line, that is 120 and 121, are known and positions of the intermediate points are unknown, a path plus or minus one pel symmetrically arranged about the end points is required to guarantee inclusion of all the pels. This is shown in FIG. 18B in which the circled points represent an alternative series of points joining the end points 120 and 121. It follows, therefore, that a deviation of plus or minus one pel from any point in the thread must cross the linear path 133 joining the end points. It is this principle, shown in FIG. 18C, which forms the basis for the improved linearity monitor.

Figure 19A:
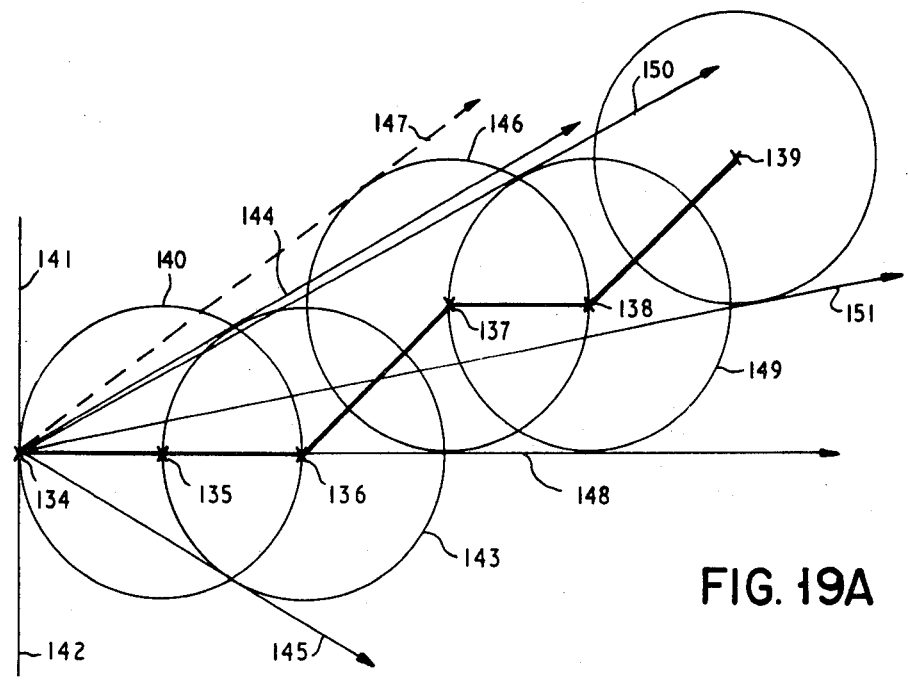
FIGS. 19A to 19D show variations of this second method of tracking a line.

Referring now to FIG. 19A, a sequence of points 134 to 139 is shown. The point 134 is the origin of the line. A logical aperture 140 in the form of a circle, one pel in radius, is positioned at the point 135, and the tangents from the origin 134 are constructed (141 and 142). The angle between the tangents (in this case 180°) is called the acceptance angle for subsequent points. The next point in the sequence, that is, the point 136, lies within the acceptance angle and therefore satisfies the linearity requirement. A new logical aperture is constructed at the point 136 in the form of a circle 143 and the tangents 144 and 145 to this circle are drawn. The acceptance angle now reduces to the angle between the tangents 144 and 145 and the next point in the sequence, that is the point 137, is tested to determine whether it falls within the new acceptance angle. Since it does, the line represented by points 134, 135, 136 and 137 is regarded as meeting the linearity constraints.

A new logical paerture 146 is constructed at point 137. New tangents 147 and 148 are drawn and the new acceptance angle is defined as the angle between the tangents 144 and 148. The tangent 147 is not used as a new boundary condition since it lies outside the tangent 144. Since the point 138 lies within the current acceptance angle (defined by the tangents 144 and 148) it is accepted as lying on the same straight line constituted by the points tracked so far, the points 134 to 137.

A new acceptance angle is derived from a logical aperture 149 and is bounded by tangents 148 and 150. The point 139 is within this new acceptance angle and if there are further points in the series, the first one or more would be tested within a new acceptance angle defined by the tangent 150 and a tangent 151.

Figure 18C:
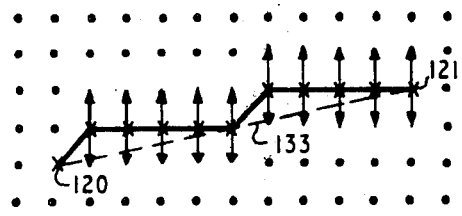

As every new point is a potential end point, this process ensures that the plus or minus one pel deviation from all previously accepted points continues to satisfy the condition illustrated in FIG. 18C. A newly accepted point may cause either or both boundaries of the acceptance angle to be modified. Update of the acceptance angle always results in narrowing of the angle.

When a new point is found to lie outside the acceptance angle to date, this causes vector termination at the previously accepted point and the start of a new vector at that point.

Figure 19B:
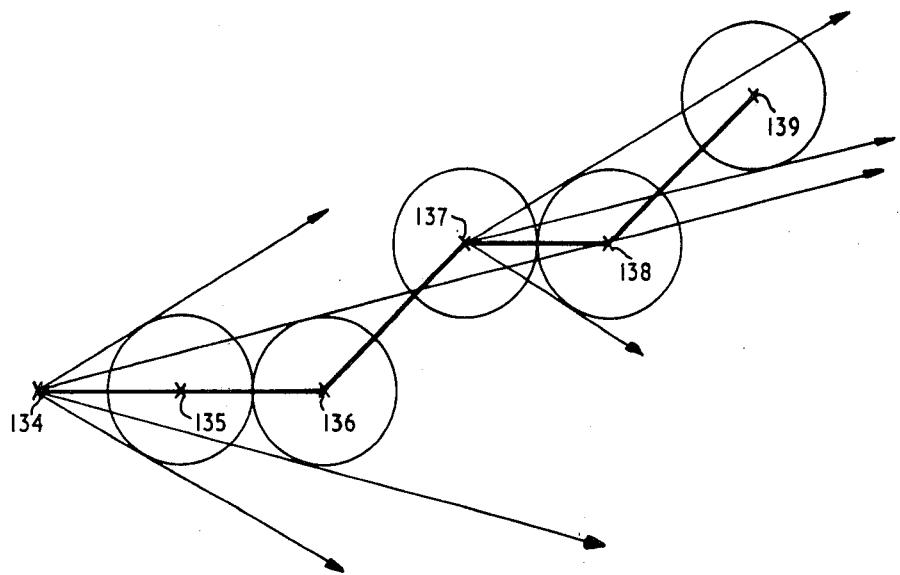

FIG. 19B shows how the linearity restraint is made too severe by decreasing the size of the tolerance aperture from one pel radius to ½ pel radius. In this case, instead of the points 134 to 139 representing one vector as in FIG. 19A, they represent two vectors constituted by the points 134 to 136 and the points 136 to 138.

Figure 19C:
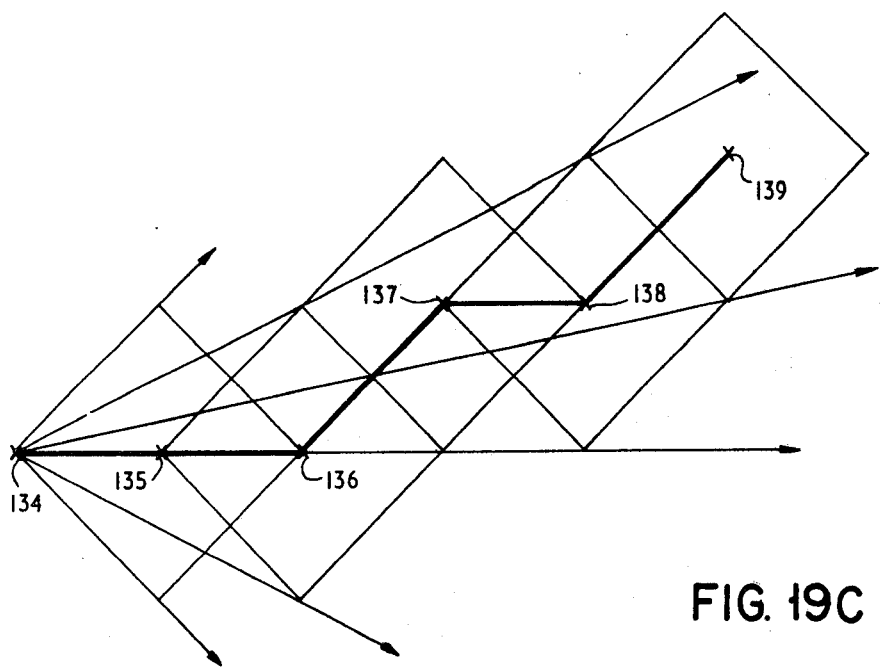
Figure 19D:
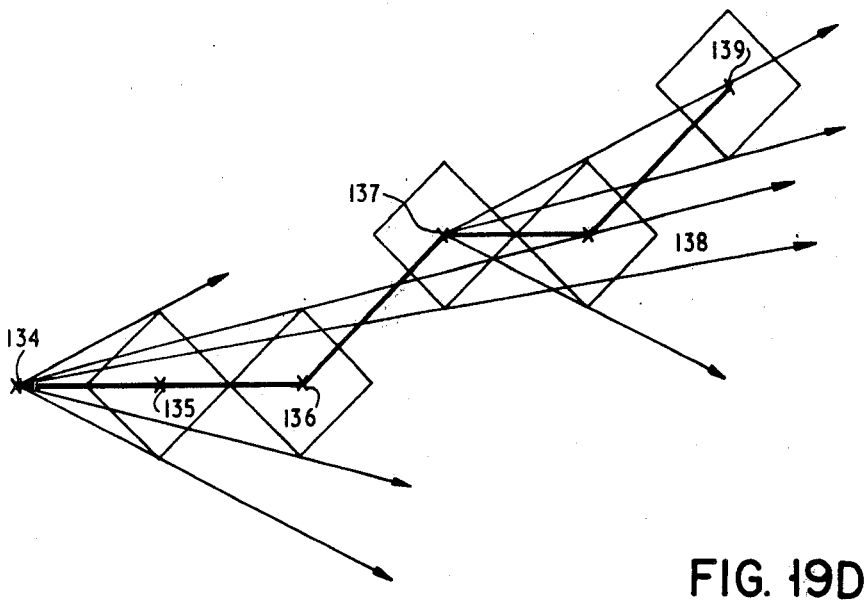

FIGS. 19C and 19D illustrate how the tolerance aperture need not be circular but preferably is diamond shaped. In FIG. 19C, the diamond has a diagonal equal in length to two pels. In FIG. 19D, the diagonal of the diamond is one pel giving tighter tolerances. Similar reference numerals are used in FIGS. 19C and 19D as in FIGS. 19A and 19B.

Figure 20:
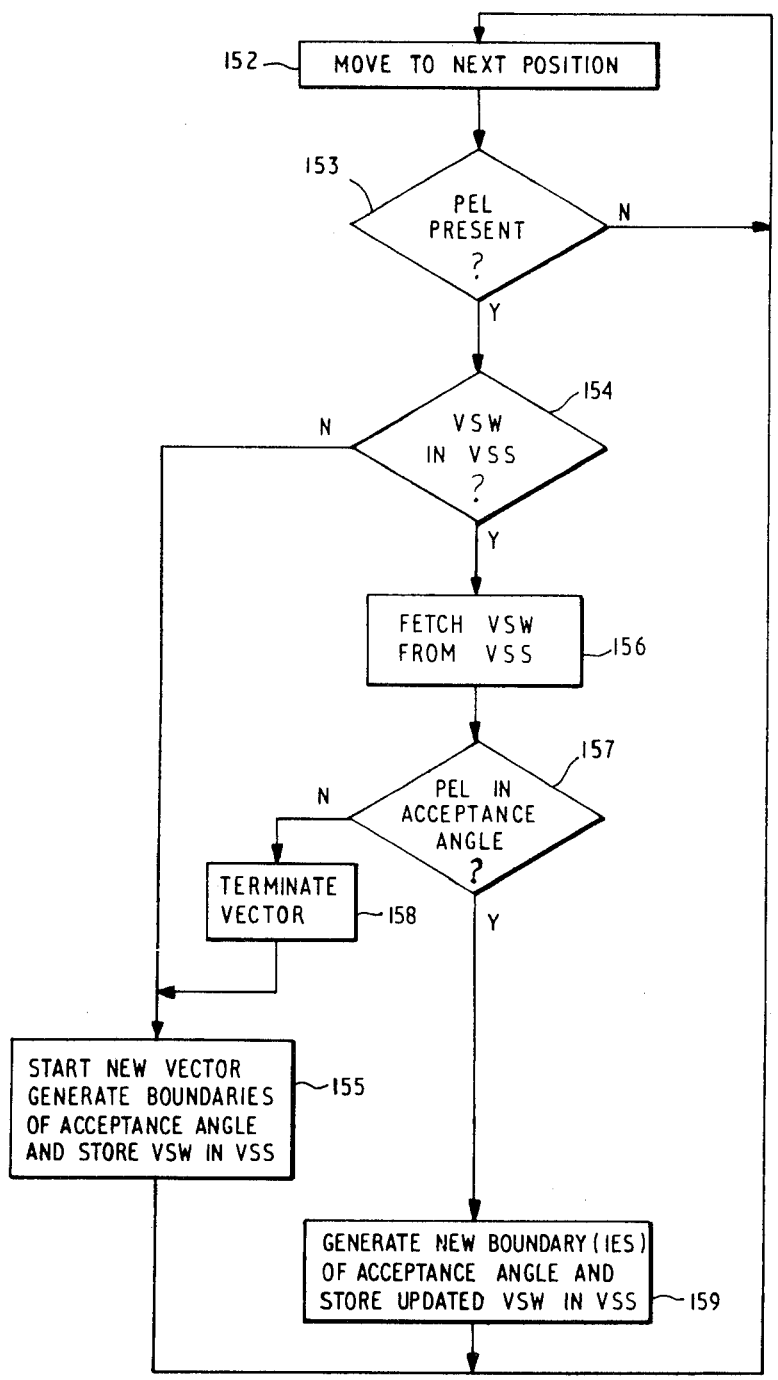
FIG. 20 is a simplified flow chart summarizing this second method of line tracking.

FIG. 20 is a flow chart summarizing the linearity testing described with reference to FIGS. 18 and 19. When the next position in the processed raster scan is reached as in a block 152, a determination is made in a decision block 153 as to whether a pel is present. If it is not, the next position is considered by returning to the block 152. If a pel is present, a determination is made in a decision block 154 to determine whether a vector status word is present in a vector status store. If there is no vector status word, a vector status word for a new vector is created as shown in a block 155: boundaries for the acceptance angle are calculated and stored in the vector status store.

If the determination at the decision block 154 is positive, the vector status word is fetched from the vector status store as shown in a block 156 and a determination is made in a decision block 157 as to whether the current pel lies within the current acceptance angle. If it does not, the old vector is terminated as illustrated in a block 158 and a new vector is started as shown in the block 155. If the determination in the decision block 157 indicates that the pel lies within the acceptance angle, the vector status word is updated with a new boundary or boundaries and is restored in the vector status store as described in a block 159.

Figure 21:
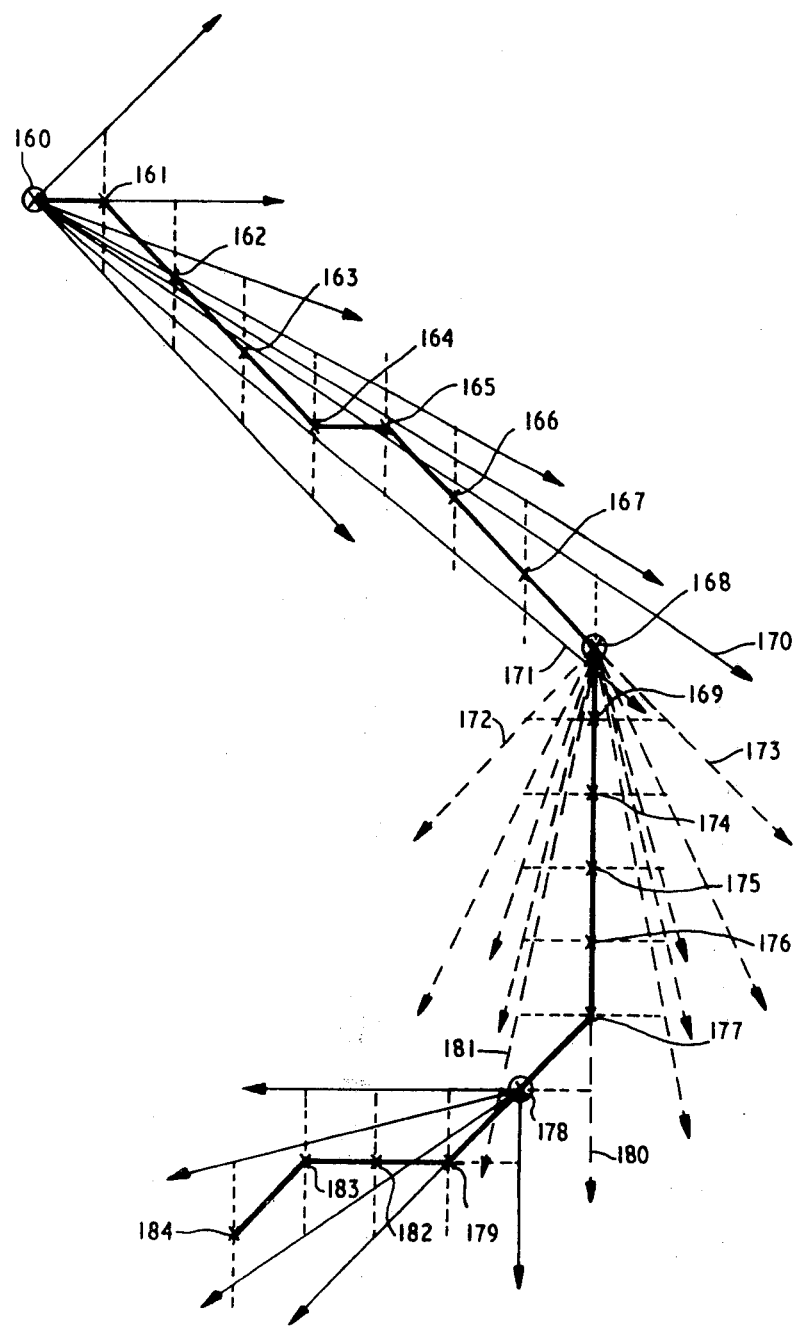
FIG. 21 illustrates how three vectors are tracked in accordance with the second method.

This linearity testing technique will be described in more detail below but first FIG. 21 will be described to show the tracking of a line using diamond shaped tolerance apertures having diagonal sizes of two pels. Point 160 is the origin of the first vector to be considered. Although diamond shaped tolerance apertures are used with two pel long diagonals, only the relevant diagonals are shown to prevent undue cluttering of the drawing. As will be seen, each successive point 161, 162, 163 ... 168 falls within the acceptance angle current for the point, but point 169 falls outside the acceptance angle constituted by boundaries 170 and 171.

The first vector is thus terminated with its end addresses as the points 160 and 168. A second vector is initiated, it being a matter of choice whether the new vector is regarded as starting at the point 168 or at a point 169. In the example shown, the point 168 is chosen as the origin and the first acceptance angle is generated (constituted by boundaries 172 and 173). As each of further points 174 and 178 is considered, the acceptance angle is progressively narrowed until eventually a point 179 is reached which falls outside boundaries 180 and 181. The point 178 is therefore regarded as the finish of the second vector and the start of a third vector. Points 179, 182, 183 and 184 constitute further points on this third vector.

FIGS. 22A to 22D, 23A and 23B and FIGS. 24A and 24B show how it is determined whether a point falls within the acceptance angle and how the acceptance angle is updated. For simplicity, the operation is described with respect to one side of the acceptance angle only.

In FIGS. 22, 23, and 24, $x_c$ and $y_c$ are the coordinates of the anti-clockwise boundary of the acceptance angle with respect to the vector origin $x_L$ and $y_L$ are the coordinates of the vector of length N bits with respect to its origin, $\Delta x_L$ and $\Delta y_L$ are the incremental x, y extensions respectively to the vector of length N to make it length N+1 with coordinates $x_L'$, $y_L'$ with respect to its origin, XP is the cross product at length N, and XP' is a modified value.

Figure 22A:
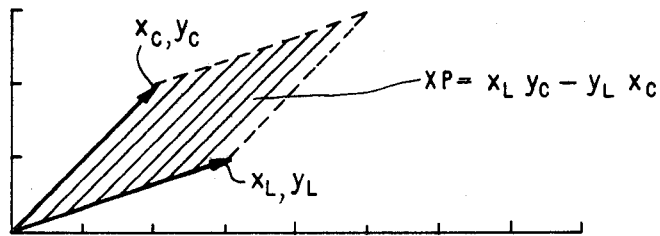
FIGS. 22A–D illustrate how a test is made to determine whether a point lies on a vector by determining cross products and how the acceptance angle is updated, FIGS. 23A and B are similar to FIGS. 22A–D but illustrates how a point is determined not to lie on a vector, FIGS. 24A and B are similar to FIGS. 22A–D and shows how on some occasions the acceptance angle does not require update even though a point lies on a vector.
Figure 22B:
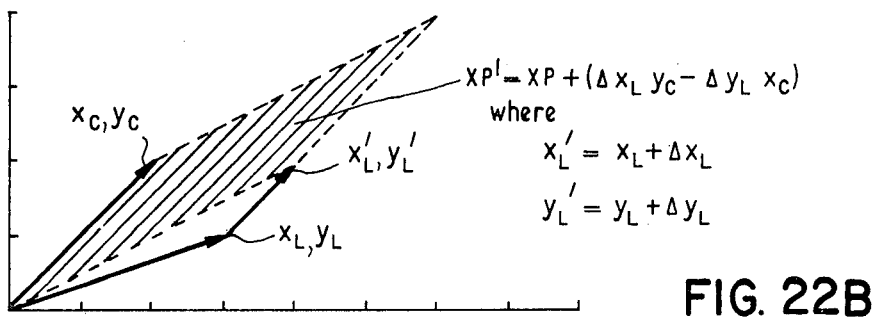
Figure 22C:
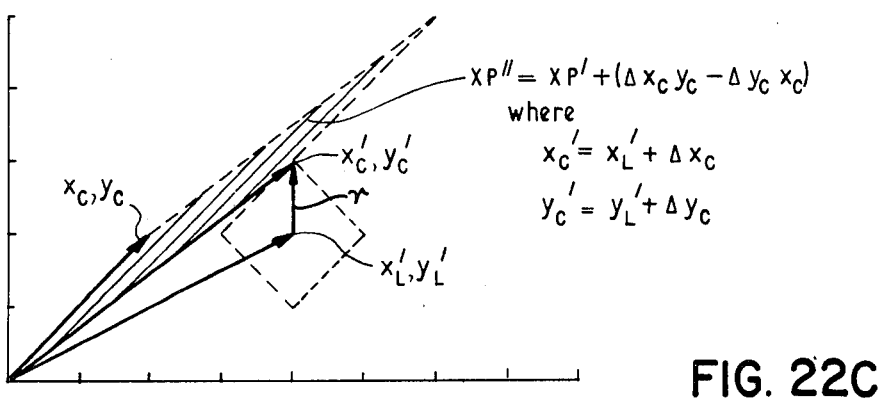
Figure 22D:
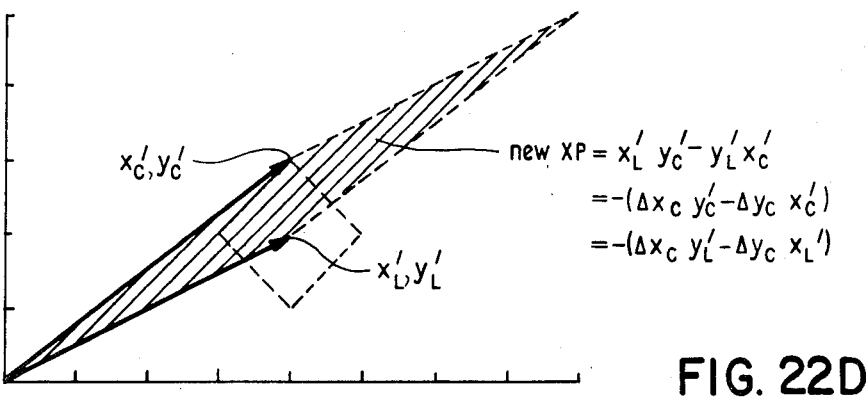

FIG. 22A shows an acceptance angle edge, a vector of length N and the positive cross product represented by a parallelogram shown shaded. FIG. 22B illustrates an extension of the vector to a length N+1 and the first modification XP' to the cross product which remains positive indicating that the point $x_L'$, $y_L'$ is a valid point in the vector. FIG. 22C shows a diamond shaped tolerance aperture positioned at the extremity $x_L'$, $y_L'$ of the vector and the consequent second modification of the cross product XP" which remains positive indicating that acceptance angle update is required. FIG. 22D shows the consequent updated acceptance angle and cross product resulting from the condition in FIG. 22C.

Figure 23A:
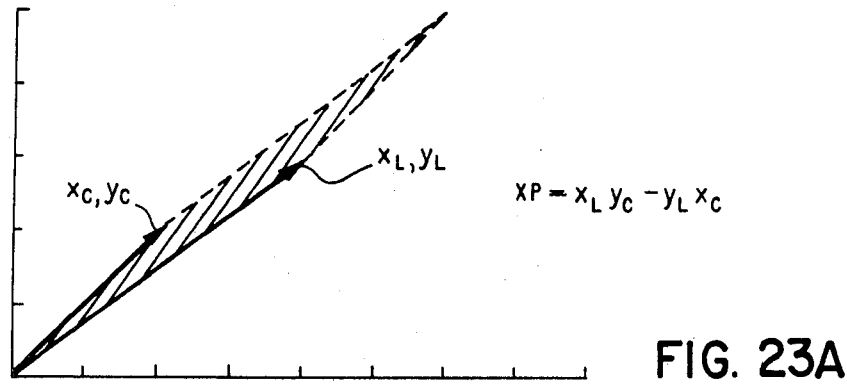
Figure 23B:
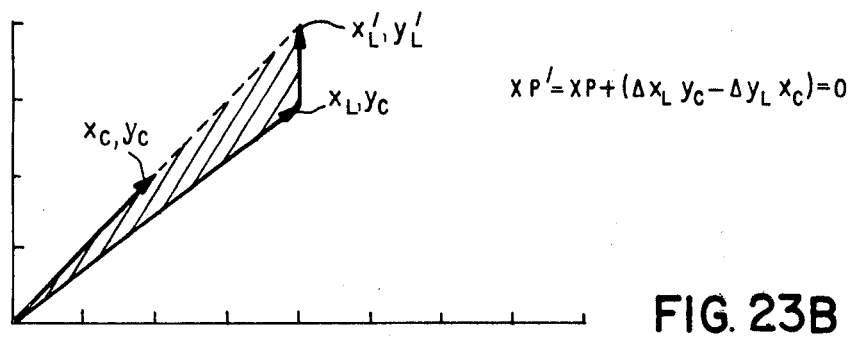

FIG. 23A is similar to FIG. 22A and shows a vector terminating at point $x_L$, $y_L$ with one side of the acceptance angle being defined by $x_c$, $y_c$. The shaded parallelogram represents the cross product $x_L y_c - y_L x_c$. FIG. 23B shows an extension of the vector to a length N+1. However, since the first modification to the cross product XP' is now zero, the point $x_L'$, $y_L'$ is rejected as a valid end point and the vector is terminated at $x_L$, $y_L$.

Figure 24A:
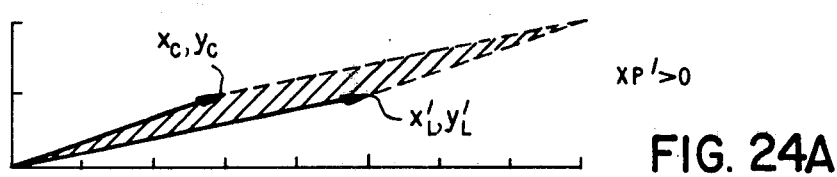
Figure 24B:
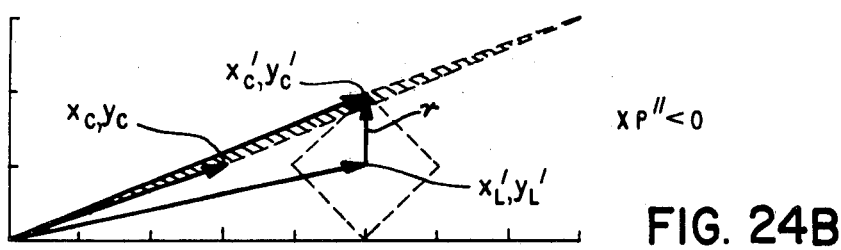

FIG. 24A is similar to FIG. 22B and shows that since the modified cross product XP' is greater than zero, then the point $x_L'$, $y_L'$ represents a value extension of the vector. However, as shown in FIG. 24B, when the second modification of the cross product (XP") is calculated, it is less than zero. This means that the edge of the acceptance angle does not require update. The shaded parallelogram represents this negative cross product.

Figure 25:
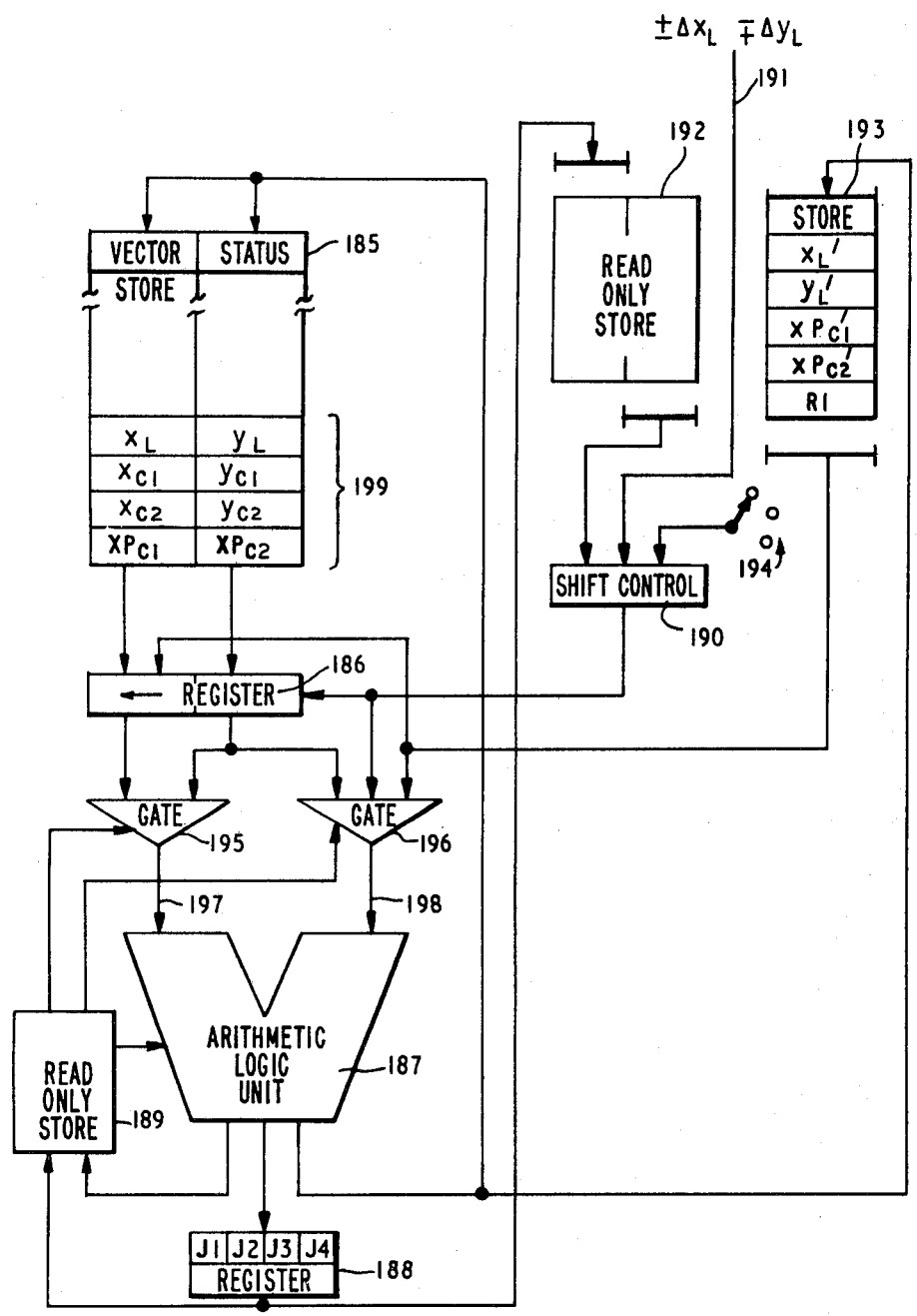
FIG. 25 is a block diagram of apparatus for performing the second method of tracking a line.

FIG. 25 illustrates apparatus for tracking vectors in accordance with the technique described with reference to FIGS. 18 to 24. Referring now to FIG. 25, the apparatus includes a vector status store 185 containing information on each vector being tracked. The output of the store 185 is connected to a shiftable output register 186 whose outputs are connected through gating circuits or funnels 195 and 196 to an arithmetic logic unit 187. A register 188 is connected to receive flags $J_1$ to $J_4$ whose purpose will be described later. A read only store 189 is connected to receive the outputs of the register 188 and the arithmetic logic unit 187, and is used to test the co-linearity of a new point.

A shift control 190, whose purpose is described below, is connected to receive signals from a data input line 191, and a sign generator read only store 192. A tolerance switch 194 connected to shift control 190 allows the tolerance of the apparatus to be varied. Results from the arithmetic logic unit 187 can be temporarily stored in a local store 193 whose contents can be supplied, as described below, to the arithmetic logic unit 187 through the funnel 196. A p bus 197 and a Q bus 198 connect the outputs of the funnels 195 and 196 respectively to the arithmetic logic unit ALU 187.

The operation of the apparatus will now be described. Incremental value of the functions are used to reduce the arithmetical power required.

The vector status store 185 contains nine parameters which relate to each vector which is being tracked; one set of values for the vector whose update will be described is identified by the numeral 199.

The values are as follows:

$x_L$—current x offset of vector end with respect to its origin, $y_L$—current y offset of vector end with respect to its origin, $x_{c1}$—current y offset, with respect to the vector origin of the clockwise edge of the acceptance angle, $y_{c1}$—current y offset, with respect to the vector origin, of the clockwise edge of the acceptance angle, $x_{c2}$—current x offset, with respect to the vector origin, of the anti-clockwise edge of the acceptance angle, $y_{c2}$—current y offset, with respect to the vector origin, of the anti-clockwise edge of the acceptance angle, $XP_{c1}$—cross product of the vector with respect to the clockwise edge of the acceptance angle on completing the acceptance sequence for the previous bit.

$XP_{c2}$—cross product of the vector with respect to the anti-clockwise edge of the acceptance angle on completing the acceptance sequence for the previous bit.

Furthermore, within this description, $\Delta x_L$ is the incremental extension to the existing vector in the y dimension, (in the implementation described, it will be 0 or a binary number). $\Delta y_L$ is the incremental extension to the existing vector in the y dimension. In the implementation descrribed, it will be 0 or a binary integer. The line tolerance r is expressed as the distance from the center to the vertex of the tolerance aperture, shown as a diamond in FIGS. 22C and 24B.

The sequence of operations required to test the co-linearity of a new point and update the vector status store values is held in the read only store 189 whose sequence steps are shown numbered in Table 1:

TABLE 1

| OPERATION | SEQUENCE |
|---|---|
| Vector Update | 1  $x_L \rightarrow$ P (bus 197) |
|  | 2  $\Delta x_L \rightarrow$ Q (bus 198) |
|  | 3  P + Q $\rightarrow x'_L$ (store 198), sign $x'_L \rightarrow J_3$ (reg 188) |
|  | 4  $y_L \rightarrow$ P (bus 197) |
|  | 5  $\Delta Y_L \rightarrow$ Q (bus 198) |
|  | 6  P + Q $\rightarrow y'_L$ (store 193) sign $y'_L \rightarrow J_4$ (reg 188) |
| Valid end point | 7  $\Delta x_{c1} \times \Delta y_L \rightarrow$ P |
| test. Repeat for | 8  $\Delta x_L \times y_{c1} \rightarrow$ Q |
| edge c2 of acceptance | 9  P − Q $\rightarrow R_1$ (store 193) |
| angle | 10  $P_{c1} \rightarrow$ P |
|  | 11  $R_1 \rightarrow$ Q |
|  | 12  P + Q $\rightarrow XP'_{c1}$ (store 193), sign $\rightarrow J_1$ (reg 188) |
|  | 13  Br.$J_1$ = 1 wait for end of time slot. |
| Diagonal Zone | 14  $x'_L \rightarrow$ P |
|  | 15  $y'_L \rightarrow$ Q |
|  | 16  P − Q $\rightarrow R_1$ |
|  | 17  $R_1 \rightarrow$ P |
|  | 18  r $\rightarrow$ Q |
|  | 19  P < Q $\rightarrow J_1$ |
|  | 20  Br.$J_1$ = 1 |
|  | 21  $x'_L \rightarrow$ P |
| Non-diagonal | 22  $y'_L \rightarrow$ Q |
| left/right | 23  P < Q $\rightarrow J_2$ |
| upper/lower | 24  $J_1 J_2 \rightarrow$ sign generator (ROS 192) |
| Test Intersection | 25  either $x_{c1} \times \Delta y_{c1} \rightarrow$ P if $\Delta x_{c1}$ = 0 |
| of acceptance | 26  or $- \Delta x_{c1} \times y_{c1} \rightarrow$ P if $y_{c1}$ = 0 |

TABLE 1-continued

| OPERATION | SEQUENCE |
|---|---|
| angle | 27 $XP_{c1} \to Q$ |
| (Repeat for edge | 28 $P + Q \to XP_{c1}$, Sign $\to J_1$ |
| C2) | 29 $BR.J_1 = 1$ |
| | 30 $x'_L \to P$ |
| Update acceptance | 31 $\Delta c_{c1} \to Q$ |
| angle. (Repeat | 32 $P + Q \to x_{c1}$ |
| for edge c2) | 33 $y'_L \to P$ |
| | 34 $\Delta y_{c1} \to qQ$ |
| | 35 $P + Q \to y_{c1}$ |
| Update cross | 36 either $x'_L \times - \Delta y_{c1} \to P$ if $\Delta x_{c1} = 0$ |
| product (Repeat | 37 or $\Delta x_{c1} \times y'_L \to P$ if $\Delta y_{c1} = 0$ |
| for edge c2) | 38 $0 = Q$ |
| | 39 $P + Q \to XP_{c1}$ |
| | 40 $x'_L, y'_L$ to vector status store |
| | 41 End time slot. |

The first operation described in steps 1 to 3 takes $x_L$ and adds $\Delta x_L$, passed from the input line 191 via the shift control 190 and the funnel 196 into the ALU 187. The result is stored in the local store 193 in position $x_L'$ and the sign value in the flag $J_3$. The sequence 4 to 6 determines the new y coordinate and stores it in the local store 193 in position $y_L'$ and the sign value in flag $J_4$.

The sequence 7 to 13 tests the possible incremental addition to the vector ($\Delta x_L$, $\Delta y_L$) as a valid end point.

It examines whether the line extension $\Delta x_L$, $\Delta y_L$ will cause either of the updated cross products $XP'_{c1}$ or $XP'_{c2}$ to go to negative or zero. If either does, the vector is terminated. The sequence 7 to 13 is re-entrant, first testing $XP_{c1}$ then $XP_{c2}$. The operation for $XP_{c1}$ will be described in detail.

The sequence utilizes the benefit of a binary integer or zero values for $\Delta x_L$ or $\Delta y_L$ within the scanner matrix to simplify the incremental multiplication sequences. Thus, $x_{c1}$ and $y_{c1}$ are read into the vector status store output register 186 and either reset or, where the line tolerance is greater than 1, shifted selectively by the $\Delta y_L$ and $\Delta x_L$ inputs for register 186 from the shift control 190.

The two halves of the register 186 are subtracted in the ALU 187 and the resultant incremental change to the cross product is passed to the local store 193 in location $R_1$.

The contents of $R_1$ are subsequently passed back to the ALU 187 and the vector status store value is read concurrently to provide $XP_{c1}$ on the P Bus 197 to the ALU 187. The ALU sum output is returned to the local store 193, location $XP'_{c1}$. The sign value of the sum is passed to flag $J_1$ where it provides a conditional address input to the read only store 189 to terminate the sequence for a zero or negative result.

A similar sequence tests $XP_{c2}$. Provided that neither of these tests gives zero or negative results, the acceptance angle coordinates $x_{c1}$, $y_{c1}$, and $x_{c2}$, $y_{c2}$ will be updated as required.

Figure 26:
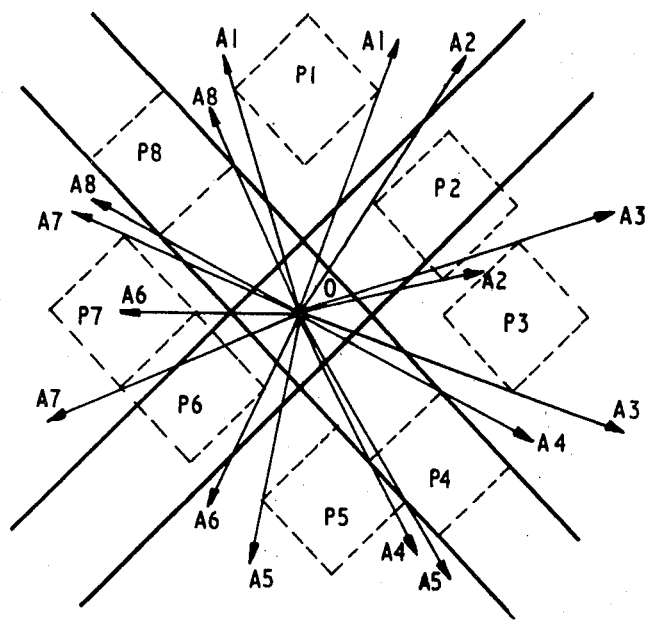
FIG. 26 illustrates how different vertices of a diamond shaped aperture are chosen in accordance with the position of the aperture with reference to the vector origin.

The sequences 14 to 20 and 21 to 24 are used to determine the zone in which the vector lies and thus the appropriate diamond aperture vertices which may be utilized to modify the acceptance angle coordinates for the updated vector. FIG. 26 shows how the appropriate aperture vertices vary dependent on whether the line lies within the diagonal bands or within the left, right, upper or lower regions. Eight pels P1 to P8 are shown together with the directions A of their associated vertex pairs.

The sequence 14 to 20 determines whether the point $x_L'$, $y_L'$ lies in the diagonal zones. The magnitudes of $x_L'$ and $y_L'$ are read from the local store 193, are subtracted in the ALU 187 and the result returned to position $R_1$ in store 193. The intermediate result in $R_1$ is re-read to the ALU P Bus 197 and the tolerance switch 194 is connected to the ALU Q Bus 198 where the values are compared in the ALU 187. The result of the test is sent to the $J_1$ flag in register 188. Steps 21 to 24 identify whether the vector is in the upper/lower or left/right non-diagonal zone. The magnitudes of $x_L'$, and $y_L'$, accessed from the local store 193 and passed to the ALU P and Q buses 197 and 198 respectively, are compared in the ALU and the result sent into the flag $J_2$ of the register 188.

The $J_1$ and $J_2$ flags together with the sign values of $x_L'$ and $y_L'$ in $J_3$ and $J_4$, respectively, provide the address input to the sign generator read only store 192 whose output is retained in the shift control 190. The relationship between the inputs of the sign generator read only store ROS 192 and its output is shown in Table 2 below.

The output of the sign generator ROS 192 ($\Delta x_{c1}$, $\Delta y_{c2}$, and $\Delta x_{c2}$, $\Delta y_{c2}$) identity which vertices of the diamond aperture are valid offsets for defining the acceptance angle from the updated vector as in FIG. 26. Due to the shape of the tolerance aperture, either $\Delta x_{c1}$ or $\Delta y_{c1}$ and $\Delta x_{c2}$ or $\Delta y_{c2}$ will be 0. This fact is used in subsequent acceptance angle and cross product generation.

TABLE 2

| INPUT ADDRESS | | | | OUTPUT | | | |
|---|---|---|---|---|---|---|---|
| Sign $x'_L$ | Sign $y'_L$ | $J_1$ (Diagonal Zone) | $J_2$ (Non-Diagonal) | $\Delta x_{c1}$ | $\Delta y_{c1}$ | $\Delta x_{c2}$ | $\Delta y_{c2}$ |
| 0 | X | 0 | 0 | 00 | 10 | 00 | 01 |
| 1 | X | 0 | 0 | 00 | 01 | 00 | 10 |
| 0 | X | 0 | 1 | 01 | 00 | 10 | 00 |
| 1 | X | 0 | 1 | 10 | 00 | 01 | 00 |
| 0 | 0 | 1 | X | 00 | 10 | 10 | 00 |
| 0 | 1 | 1 | X | 10 | 00 | 00 | 01 |
| 1 | 0 | 1 | X | 01 | 00 | 00 | 10 |
| 1 | 1 | 1 | X | 00 | 01 | 01 | 00 |

0 = +ve
1 = −ve
X = don't care
Diagonal zone = 1
Non-diagonal zone = 0
Left/right zone = 0
Upper/lower zone = 1
Zero value = 00
+ve value = 01
−ve value = 10

In steps 25 and 26, table 1, $x_{c1}$ and $y_{c1}$ are transferred from the vector status store 185 to the output register 186 and are selectively reset by the absence of a $\Delta x_{c1}$ or $\Delta y_{c1}$ condition. The output register 186 reset is 'OR'ed through the funnel 195 to the ALU input 197 while $XP'_{c1}$ (or $XP'_{c2}$ as appropriate) is read from the local store 193 to the Q bus input 198 and into the ALU 187. The sign of the sum is sent to the $J_1$ flag and is tested by the read only store 189 to branch from the sequence. A positive cross product result indicates that the coordinates and cross product for the clockwise edge of the acceptance angle require update.

The update operations occur in steps 30 to 38 of table 1. In steps 30 to 32, $x_L'$ is sent to the ALU P Bus 197, and $\Delta x_{c1}$ is sent to the ALU Q Bus 198. The ALU sum output is returned to the vector status store 185 as $x_{c1}$ ($x'_{c1}$).

Steps 33 to 35 derive the y coordinate $y_{c1}$ ($y'_{c1}$) of the clockwise edge in a similar manner.

In steps 36 to 39, the new cross product between the updated vector $x_L'$, $y_L'$ and the new clockwise edge of the acceptance angles is generated. $x_L'$ and $y_L'$ are taken to the two halves of the vector status store output register 186. The $y_L'$ entry is reset if $\Delta x_{c1}$ is zero, and the $x_L'$ entry is reset if $\Delta y_{c1}$ is zero. The 'OR'ed result from funnel 195 is returned to the vector status store 185 location $XP_{c1}$.

A similar sequence derived by re-entering steps 30 to 39 is used to update the anti-clockwise edge of the acceptance angle. Finally in step 40, the $x_L'$ and $y_L'$ values held in the local store 193 are returned to the vector status store 185 locations $x_L$ and $y_L$, respectively, to complete the update sequence for the present bit.

Thus, from a raster scanner producing a raster bit pattern, a number of vectors representing the image scanned has been produced. Although the vector list could be used directly to store the image, it may be preferable for an operator to interact with the vector list to correct errors and to add information which cannot be handled by the scanning and vectorizing apparatus. Such operations might include the correction of broken lines produced by inferior original documents; the addition of attributes to the various vectors, for example, color, dotted line, etc; and the editing or recording of text etc. of the document.

Figure 27:
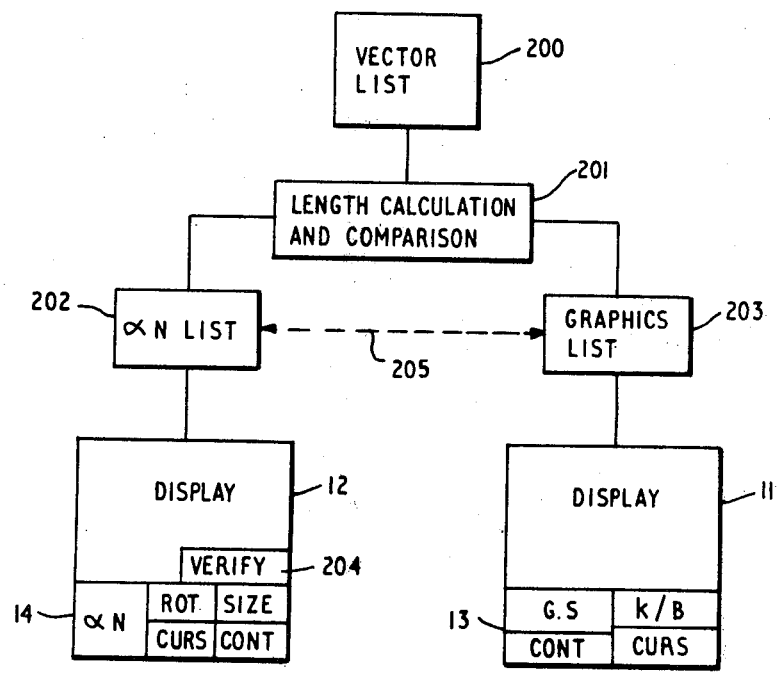
FIG. 27 illustrates how vectorized data can be divided into alphanumeric and graphic data.

To this end and referring now to FIG. 27, the vector list 200 contained within the vector store 8 (FIG. 1) is manipulated within the subsystem controller 10 (FIG. 1) to divide the vectors into two groups. It can be assumed that relatively long vectors are graphical lines and relatively short vectors are associated with the alphanumeric or other symbolic characters. Thus, by calculating the lengths of the vectors and comparing this with a threshold, as is done in a length calculation and comparison block 201, the full list is divided into an "alphanumeric" list, block 202, consisting of short vectors and a "graphics" list, block 203, consisting of long vectors. These lists are expanded within the controller 10 for display on the respective screens 12 and 11, FIG. 1.

As indicated earlier, the screens can be of a raster display type in which the lines are built up from discrete points on a matrix or of the directed beam type in which the line between two points is traced out by the CRT beam. If a storage tube is used, no refreshing of the screen is required. No further details of the display technique will be given since these are well understood and are ancillary to the present invention.

Thus, shown on display 12 will be all the alphanumeric characters and other short vectors. The keyboard 14 consists of alphanumeric and other symbolic character keys, and keys for controlling various functions and features such as for rotation and sizing, and a cursor. An area 204 of the display 12 screen is reserved for verification purposes. Using the keyboard and controls, an operator can annotate the display, correct erroneous characters, etc. Any data entered by the operator is first displayed in area 204 so that it can be verified before entering the system. If desired, the alphanumeric characters can be recoded into a convenient form such as EBCDIC (Extended Binary Coded Decimal Interchange Code) rather than vector form. This would be accomplished by positioning the cursor of the selected character and then operating the appropriate alphanumeric and control keys.

Also identifiable on the screen will be those short vectors which are actually graphical rather than symbolic. Under operator control, these short vectors can be transferred from the "alphanumeric" list 202 to the "graphics" list 203 as represented by line 205. The vectors in the graphics list are displayed on screen 11: by means of keyboard 13 containing graphic symbols, control keys, cursor control, etc., the operator can enter information. Thus, attributes can be assigned to various vectors, continuous lines which have been broken up due to the digitizing and vectorizing process can be corrected, and new vectors can be overlaid on the existing picture.

The principles of the present invention have now been made clear in illustrative embodiments. There will be immediately obvious to those skilled in the art, many modifications of structure, arrangement, proportions, the elements, material and components used in the practice of the invention. For instance, instead of using a rectangular raster scan, a circular or spiral scan could be employed with consequential changes to the apparatus described. Instead of using read only stores, read/write random access stores could also be used.

The appended claims, therefore, are intended to cover and embrace any such modification, within the limits only of the true spirit and scope of the invention.

What is claimed is:

1. In a method for compressing objects formed from contiguous pels having the same first color value in an m×n array of pels by vector encoding reduced objects, said method includes the step of thinning each object by raster scanning the array and retaining in the original array locations i, j, only those pels of the first color which define a color transition or border and deleting all others, $1 \leq i \leq m$, $1 \leq j \leq n$; wherein the improvement comprises the steps of:

testing each retained pel in each ith scan line of the processed array of thinned objects in order to determine its contiguity and linear position relationship to a pel of the same first color value in either the ith or the ith−1 scan lines, by ascertaining whether said retained pel lies within a region of contiguous retained pels (FIG. 21/154) and if it lies within said region, ascertaining whether said retained pel lies within an aperture (FIG. 19) whose sides constitute an angle of acceptance (FIG. 20/156, 157), and if it lies within said aperture, narrowing said aperture so as to define a smaller included angle (FIG. 20/159); and encoding each retained pel in said ith scan line of the processed array of thinned objects either as the origin of a new vector if the retained pel is noncontiguous, as a continuation of a previous vector if the retained pel is both contiguous and linear, or as a termination of a previous vector if the retained pel is contiguous and nonlinear, the steps of testing and encoding being performed on a consecutive raster scan line-at-a-time basis.

* * * * *